(12) United States Patent
Sekar

(10) Patent No.: US 8,771,451 B2
(45) Date of Patent: Jul. 8, 2014

(54) METHODS FOR MANUFACTURING A PAINT ROLLER AND COMPONENT PARTS THEREOF

(76) Inventor: Chandra Sekar, Searingtown, NY (US)

( * ) Notice: Subject to any disclaimer, the term of this patent is extended or adjusted under 35 U.S.C. 154(b) by 0 days.

(21) Appl. No.: 13/431,597

(22) Filed: Mar. 27, 2012

(65) Prior Publication Data

US 2013/0075021 A1 Mar. 28, 2013

Related U.S. Application Data

(63) Continuation-in-part of application No. 12/687,028, filed on Jan. 13, 2010, now Pat. No. 8,142,587, which is a continuation-in-part of application No. 12/435,946, filed on May 5, 2009, application No. 13/431,597, which is a continuation-in-part of application No. 12/463,876, filed on May 11, 2009, now Pat. No. 8,142,599, which is a continuation-in-part of application No. 12/350,798, filed on Jan. 8, 2009, now Pat. No. 7,850,812.

(51) Int. Cl.
*B65H 81/00* (2006.01)

(52) U.S. Cl.
USPC ........... 156/188; 156/185; 156/187; 156/190; 156/193; 156/195; 242/443; 242/443.1; 242/444; 242/445; 242/445.1

(58) Field of Classification Search
CPC ................ B05C 17/02; B05C 17/0207; B29L 2031/328; B29K 2023/12; B29C 47/0021; B29C 47/0059; B29C 47/38; B29C 53/581; B29C 63/0069; B29C 63/105; B29C 2063/485; B29C 2793/009

USPC ......... 156/187, 185, 188, 190, 193, 195, 426, 156/428–432; 242/430, 443–444, 445, 242/445.1

See application file for complete search history.

(56) References Cited

U.S. PATENT DOCUMENTS

| | | | | |
|---|---|---|---|---|
| 5,572,790 A | * | 11/1996 | Sekar | 29/895.211 |
| 6,503,595 B1 | * | 1/2003 | Kim et al. | 428/97 |
| 2002/0077234 A1 | * | 6/2002 | Sekar | 492/13 |
| 2003/0104161 A1 | * | 6/2003 | Edwards | 428/85 |

FOREIGN PATENT DOCUMENTS

WO WO 00/44969 * 8/2000

OTHER PUBLICATIONS

Wypych, George. Handbook of Fillers ($2^{nd}$ Edition). ©2000 ChemTec Publishing.*

* cited by examiner

*Primary Examiner* — Katarzyna Wyrozebski Lee
*Assistant Examiner* — Carson Gross
(74) *Attorney, Agent, or Firm* — Greenberg Traurig LLP

(57) ABSTRACT

Described are methods of making a thermoplastic core paint roller using a composite cover material having a backing made from a compound comprising a polypropylene-based elastomer and calcium carbonate having between 5% and 50% calcium carbonate by weight. One or various compounds of polypropylene and calcium carbonate having between 5% and 66% calcium carbonate by weight may be used to form portions of one or multiple components that make up the paint roller, including, for example, the thermoplastic strips and/or the adhesives. The materials can be assembled in a continuous manufacturing process.

18 Claims, 17 Drawing Sheets

METHODS FOR MANUFACTURING A PAINT ROLLER AND COMPONENT PARTS THEREOF

This application is a continuation-in-part of U.S. patent application Ser. No. 12/687,028, filed Jan. 13, 2010, now U.S.Pat. No. 8,142,587 which is a continuation-in-part of U.S. patent application Ser. No. 12/435,946, filed May 5, 2009. The present application is also a continuation-in-part of U.S. patent application Ser. No. 12/463,876, filed May 11, 2009, now U.S. Pat. No. 8,142,599 which is a continuation-in-part of U.S. patent application Ser. No. 12/350,798, filed Jan. 8, 2009 now U.S. Pat. No. 7,850,812. The entire disclosures of each of the priority applications are incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

This invention pertains to methods and apparatuses for making paint rollers of the type used for applying paint to walls and the like. More specifically, the invention pertains to methods and apparatus for making a composite cover material for use in a paint roller manufacturing process, and to making paint rollers that are formed from a composite cover material.

BRIEF DESCRIPTION OF THE DRAWINGS

In the accompanying drawings forming a part of this specification, and in which like reference characters are employed to designate like parts throughout the same.

DETAILED DESCRIPTION SUBSTANTIALLY AS FILED IN U.S. PATENT APPLICATION SER. NO. 12/687,028

Figure 1:
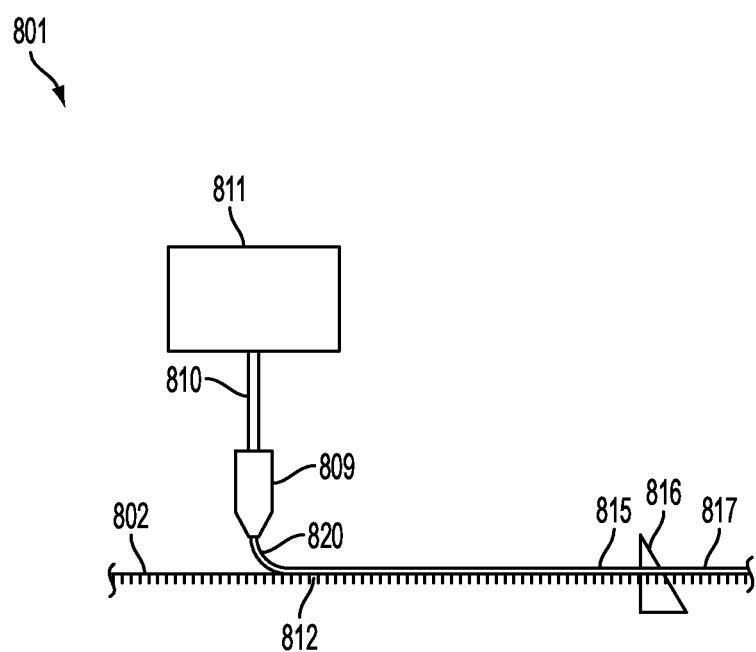
FIG. 1 is a side view diagrammatic representation of an apparatus for making composite cover material in accordance with an embodiment of the present invention.

FIG. 1 shows an apparatus 801 for forming composite cover material 817. In an embodiment, the apparatus comprises an adhesive applicator 809 that receives a supply of adhesive from an adhesive supply 811 via a feeder 810, and a strip cutter 816.

The composite cover material 817 is formed using a supply of pile material 802 such as would be suitable for use manufacturing a paint roller cover. The composite cover material is formed using a continuous supply of pile material such as would be suitable for use manufacturing a paint roller cover. Suitable pile material 802 may be used such as the material that can be manufactured using a sliver knitting machine such as the SK-18 available from Mayer Industries Inc. Such knitted pile material may be made "in the round," and slit for use as a continuous pile material. Once slit, the knitted pile material can be laid flat for further processing. As an alternative to the knitted pile material, a woven pile material may be used, such a woven pile material, while generally more expensive than the knitted material, is advantageous as its fibers are better locked in during the weaving process rather than by later application of an adhesive. The knitted or woven pile material 2 is usually sheared (not shown) on the pile side to attain a desired pile height. As an alternative to woven or knitted materials, a microfiber material may be used. The material 2 can have any usable width, such as widths of approximately 32" or 60", and can be manufactured or sheared to a desired pile height. The material 802 can have any usable width, for example, a width of approximately 32" or 60". In an embodiment, the material has a pile side (shown facing downwards) and a fabric side (shown facing upwards).

In an embodiment, the material 802 is laid flat with its pile side down and moved towards an adhesive layer 802 being dispensed from the adhesive applicator 809. A tenter (not shown), also known as a tenter frame, or a similar apparatus may be used to advance the material 802. In an embodiment, the material 802 is moved in a generally horizontal direction with the pile side down.

An adhesive layer 820 is dispensed from the adhesive applicator 809 onto the fabric backing of the material 802. The adhesive supply 811 supplies the adhesive to the applicator 809 via a feeder 810. In an embodiment, the adhesive is made predominantly or entirely from polypropylene resin, the adhesive applicator 809 may be a die head and the supply 811 and feeder 810 are parts of an extruder suitable for use to extrude polypropylene resin into the adhesive layer 820. After the adhesive layer 820 has been applied to the fabric backing of the material 802 they are allowed to set and/or bond together. The setting of the adhesive layer and/or the bonding between the adhesive layer 820 and the fabric backing of material 802 may be affected by control of the environment (e.g., the application of heating or cooling, or otherwise) after the adhesive 820 is dispensed from the applicator 809 but before it has set fully. It is within the scope of the invention to permit the setting of the adhesive layer 820 and its bonding to the material 802 through the use of environmental intervention and/or mechanical intervention.

In an embodiment, a polypropylene adhesive layer 820 is applied to the fabric backing of the material 802 in a molten, or at least partially liquefied state. For the purpose of this document, the term polypropylene is not intended to require that the adhesive, strip or other material be made solely of polypropylene, but that it is made predominantly from polypropylene, and may contain some or a substantial portion of additives as may be desirable. In an embodiment, after its application to the fabric backing of the material 802, the molten polypropylene adhesive layer 802 fills interstitial spaces or gaps within the fabric backing of the material 802 before setting, thus integrating the adhesive layer 820 with the material 802, and forming a composite sheet material 815. The thusly formed composite sheet material 815 is stiffer than the material 802 absent the integrated materials from the adhesive layer. In an embodiment, the fibers of the of the composite sheet material 815 are locked in place by the integrated materials from the adhesive layer.

After its application to the fabric backing of the material 802, the molten polypropylene adhesive layer 802 can set with an even or smooth exposed surface as it forms the composite sheet material 815 with a generally uniform non-porous backing.

The composite sheet material 815 is advanced across cutter 816 to form composite cover material 817. The cutter 816 may be used to cut the composite sheet material 815 into strips of composite cover material 817 in a desired width. The strips of composite sheet material 815 do not need to be cut to equal widths. It is within the scope of this invention to cut differing width composite cover material 817 from a single composite sheet material 815, for example, by varying the spacing of the cutting edges of the cutter 816.

In an embodiment, the strips of composite cover material 817 each have a width of approximately 2⅞ inches, corresponding to a width of cover material that may typically be used to manufacture paint rollers. The composite cover material 817 may be spooled and cut such that it can be transported for use at another site or on another machine performing a continuous manufacturing process for laminated paint rollers. In another embodiment, the composite cover material may be feed directly to an apparatus that uses the material in forming laminated paint rollers. Where the composite cover material is spooled, it may be desirable to spool the composite cover material 817 while it is still warm and pliable, alternatively, it may be desirable to ensure that the composite cover material 817 is fully cooled (i.e., not warm and pliable) when it is spooled.

If the pile on material 802 had not been sheared to the desired height prior to the application of the adhesive layer 820, the composite sheet material 815, or the composite cover material 817 may be cut by a pile cutter (not shown). The additional rigidity of the composite sheet material 815 or composite cover material 817 (as compared to the material 802) may make the process of shearing to a desired pile height easier.

Figure 2:
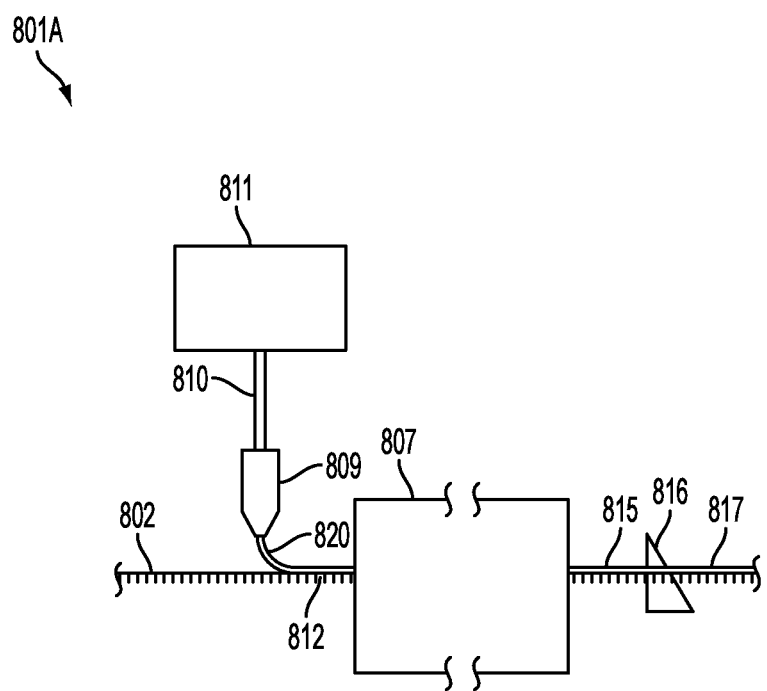
FIG. 2 is a side view diagrammatic representation of another apparatus for making composite cover material in accordance with an embodiment of the present invention.

FIG. 2 shows an apparatus 801A for forming composite cover material 817. In an embodiment, the apparatus comprises an adhesive applicator 809, an environmental control 807 and a strip cutter 816. The adhesive applicator 809 receives a supply of adhesive from an adhesive supply 811 via a feeder 810.

Composite cover material 817 is formed using a supply of pile material 802 such as would be suitable for use manufacturing a paint roller cover. Pile material 802 is a type suitable for use as a paint roller, and in an embodiment may be knitted or woven material. The material 802 can have any usable width, for example, a width of approximately 32 inches, or of approximately 60 inches. In an embodiment, the material has a pile side (shown facing upwards) and a fabric side (shown facing downwards).

In an embodiment, the material 802 is laid flat with its pile side down and moved towards an adhesive layer 802 being dispensed from the adhesive applicator 809. A tenter (not shown) or a similar apparatus may be used to advance the material 802. In an embodiment, the material 802 is moved in a generally horizontal direction with the pile side down.

An adhesive layer 820 is dispensed from the adhesive applicator 809 onto the fabric backing of the material 802. The adhesive supply 811 supplies the adhesive to the applicator 809 via a feeder 810. In an embodiment, the adhesive is made predominantly or entirely from polypropylene resin, the adhesive applicator 809 may be a die head and the supply 811 and feeder 810 are parts of an extruder suitable for use to extrude polypropylene resin into the adhesive layer 820. Once the adhesive layer 820 has been applied to the fabric backing of the material 802 they are allowed to set and/or bond together.

The setting of the adhesive layer and/or the bonding between the adhesive layer 820 and the fabric backing of material 802 may be affected by control of the environment (e.g., the application of heating or cooling, or otherwise) after the adhesive 820 is dispensed from the applicator 809 but before it has set fully. It is within the scope of the invention to permit the setting of the adhesive layer 820 and its bonding to the material 802 through the use of environmental intervention.

In an embodiment, after the application of the adhesive layer 820 the material 812 can be fed through an environmental control 807 as it forms the composite sheet material 815. The environmental control 807 may be used to affect the bond, or the quality or completeness of the bond, between the adhesive layer 820 to the underlying material 802, and aid in integrating the adhesive layer 820 with the material 802.

In an embodiment using an environmental control 807, the control 807 may employ the application of heat, which may even or smooth the exposed surface of the adhesive layer 820.

In an embodiment using an environmental control 807, the control 807 may employ the application of heat, which may permit the adhesive in the adhesive layer 820 to better fill interstitial spaces or gaps within the material 802.

In an embodiment using an environmental control 807, the control 807 may employ the application of heat, which may allow more contact between the adhesive in the adhesive layer and the fibers making up the pile in the material 802, thereby locking fibers in place in the pile as it sets.

In an embodiment using an environmental control 807, the control 807 may employ the application of heat, which can provide the ability to control the speed at which the adhesive sets and creates the composite sheet material 815.

In another embodiment using an environmental control 807, the control 807 may employ cooling, such cooling can hasten the hardening or setting of the adhesive layer 820.

It is within the scope of the invention to employ an environmental control 807 that utilizes both the application of heat and the application of cold, seriatim, in any order, and without limitation on the number of applications or the temperature of a specific application. Using heat, cooling, multiple applications of heat or cooling, or combinations of both heat and cooling may achieve, among other things, one or more of the following: (i) evening or smoothing the exposed surface of the adhesive layer 820 to provide a generally uniform non-porous backing; (ii) permitting the adhesive in the adhesive layer 820 to better fill interstitial spaces or gaps within the material 802; and/or (iii) allowing more contact between the adhesive in the adhesive layer and the fibers making up the pile in the material 802; (iv) locking fibers in the pile in place as the adhesive sets; and/or (v) hasten or lengthening the hardening or setting of the adhesive layer 820.

Whether or not an environmental control 807 is employed, the composite sheet material 815 is advanced across cutter 816 to form composite cover material 817. As discussed above, the cutter 816 may be used to cut the composite sheet material 815 into strips of composite cover material 817 in a desired width. The strips of composite sheet material 815 do not need to be cut to equal widths. It is within the scope of this invention to cut differing width composite cover material 817 from a single composite sheet material 815, for example, by varying the spacing of the cutting edges of the cutter 816.

In an embodiment, the strips of composite cover material 817 each have a width of approximately 2⅞ inches, corresponding to a width of cover material that may typically be used to manufacture paint rollers. As discussed above, composite cover material 817 may be spooled and cut for transport, or feed directly to an apparatus that uses the material in forming laminated paint rollers. The composite cover material 817 may be spooled while it is still warm and pliable, or after it is fully cooled.

If the pile on material 802 has not been sheared to the desired height prior to the application of the adhesive layer 820, a pile cutter (not shown) can be use to shear the composite sheet material 815 or the composite cover material 817.

Figure 3:
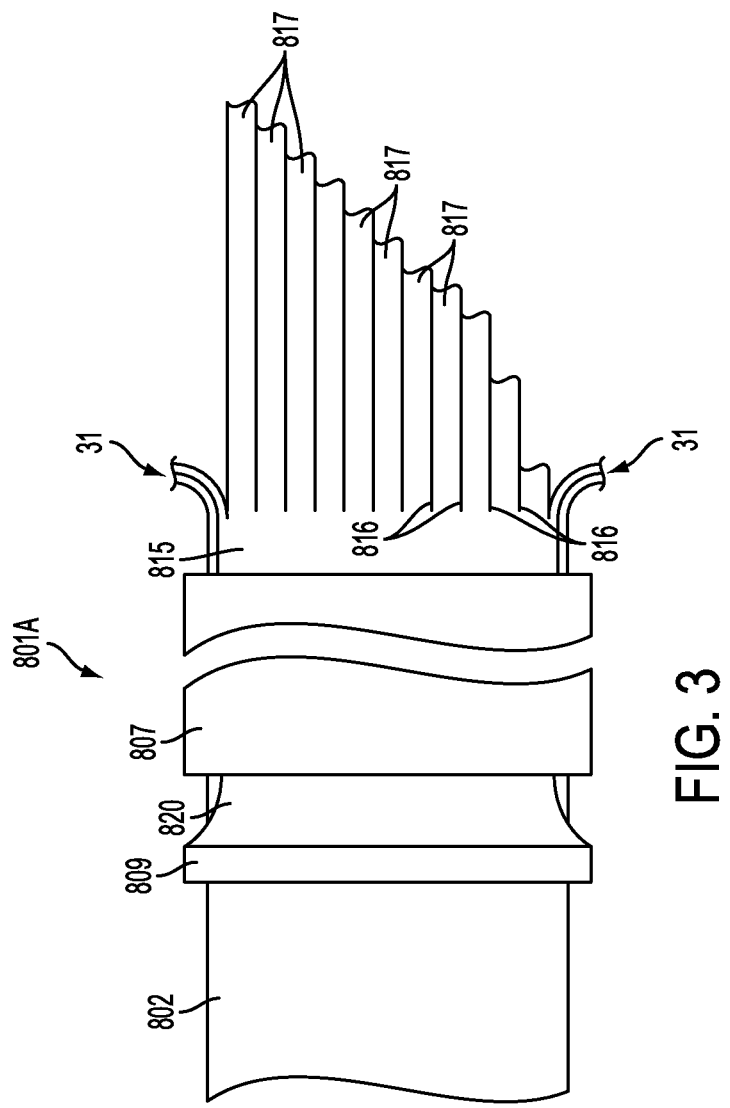
FIG. 3 is a diagrammatic top view of the apparatus for making composite cover material of FIG. 2.

FIG. 3 shows a top view is shown of an apparatus 801A for manufacturing the composite cover material 817 in accordance with an embodiment of the invention. The adhesive applicator 809 applies an adhesive layer 820 to the material 802 as the material is advanced. In an embodiment, the material 802 may be fed into the apparatus 801A directly as it is manufactured, or from pre-manufactured lengths.

In the embodiment shown in FIG. 3, the fabric-backed pile material 802 approximately 32" wide is advanced. A polypropylene adhesive layer 820, which starts wider at the applicator 809 is narrowed as it is pulled along by the advancing material 802. Where the adhesive layer 820 makes contact with the material 802, it may be between 31⅝" and 32". The adhesive layer 802 and advancing material 802 passed through environmental control 807. Smooth composite sheet material 815 emerges from the environmental control 807 and is separated into eleven strips of composite cover material 817, each being 2⅞" wide. Twelve separate blades can be used in the cutter 816 to form the eleven strips of 2⅞" each, and two small waste strips 31.

Varying the width of the material 802 is within the scope of the invention, thus, in another embodiment, the material 802 can be approximately 60" wide, and narrowed width of the adhesive layer 820 where it contacts the material 802 is between 57.5" and 60" wide. Using this configuration, and twenty-one blades for cutter 16, twenty strips of 2⅞" composite cover material can be made. As above, two small waste strips 31 will result.

While only two different examples are presented, any desired width of material 802 may be used. Where the adhesive layer 820 comprises polypropylene, and where the applicator 809 is an extruder, one limiting factor on the width of the material 802 used is the capabilities of the extruder. It is, however, within the scope of the invention to use multiple extruders to apply multiple, non-overlapping adhesive layers 802 on the material 802.

Figure 4:
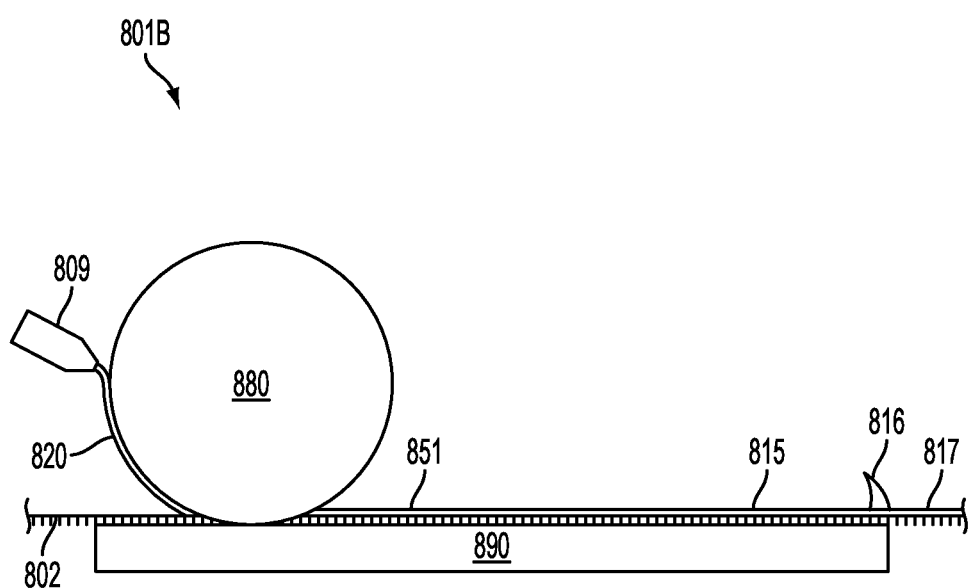
FIG. 4 is a side view diagrammatic representation of yet another apparatus for making composite cover material in accordance with an embodiment of the present invention.

FIG. 4 shows an apparatus 801B for forming the composite cover material 817. In an embodiment, the apparatus comprises an adhesive applicator 809 fed from a feeder (not shown) which gets a supply of adhesive from an adhesive supply (not shown). An advancing material 802 is deposited by an applicator 809 onto a roller 880, and runs between the roller 880 and a frame 890 having a flat portion. The roller 880 may be urged toward the frame 890 by a spring, by gravity or by other means that will be apparent to persons skilled in the art.

Composite cover material 817 is formed using a supply of pile material 802 such as would be suitable for use manufacturing a paint roller cover. The material 802 is a type suitable for use as a paint roller, and in an embodiment may be knitted or woven material. The material 802 can have any usable width, for example, a width of approximately 32 inches, or of approximately 60 inches. In an embodiment, the material has a pile side (shown facing upwards) and a fabric side (shown facing downwards).

In an embodiment, the material 802 is supported by a frame 809 such as a tenter frame with its pile side down, and moved towards the roller; an adhesive layer 820 is dispensed from the adhesive applicator 809. The frame or a similar apparatus may be used to advance the material 802. The adhesive layer may be any operable thickness. In an embodiment, the adhesive layer 820 is between 0.010" and 0.020" in thickness.

Once the adhesive layer 820 dispensed from the applicator 809 contacts the roller 880, it travels along on the outside of the roller until it is sandwiched between the roller 880 and the material 802. The positioning and angular orientation of the applicator 809 may be varied. In an embodiment, the applicator is angled between 30 degrees and 60 degrees from vertical and positioned within inches of the middle of the roller 880. In another embodiment the applicator 809 is within 30 degrees (+/−) of vertical, and is positioned to dispense adhesive such that the adhesive layer 820 first makes contact on the upper half of the roller 880. In yet another embodiment, the applicator 809 is within 30 degrees (+/−) of horizontal and is positioned to dispense adhesive such that the adhesive layer 820 first makes contact on the lower half of the roller 880. Variations in the angular orientation of the applicator 809, and its distance from and orientation around the roller are within the scope of the invention, and will be apparent to one skilled in the art.

In an embodiment, the adhesive is made predominantly or entirely from polypropylene resin and the adhesive applicator 809 may be a die head that is part of an extruder suitable for use to extrude polypropylene resin into the adhesive layer 820. In such an embodiment, the adhesive has a viscosity as it exits the extruder in the form of a sheet of molten polypropylene. The applicator 809 may be placed relatively close to the location where the adhesive layer 802 contacts the roller 880 (as shown); alternatively, in an embodiment, the applicator 809 may be placed farther away, or at another location where the adhesive layer 820 contacts the roller 880 sooner before it contacts the material 802, or after it contacts the material 802. Such variation is within the scope of this invention, and will be apparent to a person of skill in the art.

As the material 802 and the adhesive layer 820 pass between the roller 880 and the surface of the frame 890 they are urged together. The top or roller-side of the adhesive layer 820 may be smoothed or uniformly imprinted (e.g., embossed) as it passed underneath the roller 880 forming a uniform or smooth adhesive layer surface 851. The compressive force of the roller 880 may be sufficient to force adhesive into the interstitial spaces or gaps in the fabric backing of the material 802. The resulting composite sheet material 815 may be cut by cutter 816 to form the composite cover material 817 with a non-porous backing.

The roller 880 may be heated. Heating of the roller 880 may aid in the penetration of the adhesive layer 820 into the interstitial spaces or gaps within the material 802 as the adhesive layer 820 passes beneath the roller 880.

The roller 880 may be cooled. Cooling of the roller 880 may hasten the setting of the adhesive layer 820 or of the uniform or smooth adhesive layer surface 851, or both. Hastening the setting of the uniform or smooth adhesive layer surface 851 may yield a crisper imprint or a smoother surface thereon. Even if the roller 880 is cooled, the compressive force of the roller 880 may be sufficient to force adhesive into the interstitial spaces or gaps in the fabric backing of the material 802. Thus, a cooled roller may provide one or more of the following benefits: providing a smoother or crisper surface 851; hastening the setting of the adhesive, and thus the forming of the composite sheet material 815; improving the contact between the material 802 and the adhesive used to form the adhesive layer 820; and holding in place of the fibers comprising the pile of the material 802.

The roller 880 may also be operated at ambient temperature, and neither heated nor cooled. In an embodiment, the roller 880 is of a diameter that will allow it to adequately smooth or uniformly imprint the adhesive layer 820 to form the smoothed or uniform adhesive layer 851. In an embodiment, the roller 880 has a diameter between about 14" and 20".

Figure 5A:
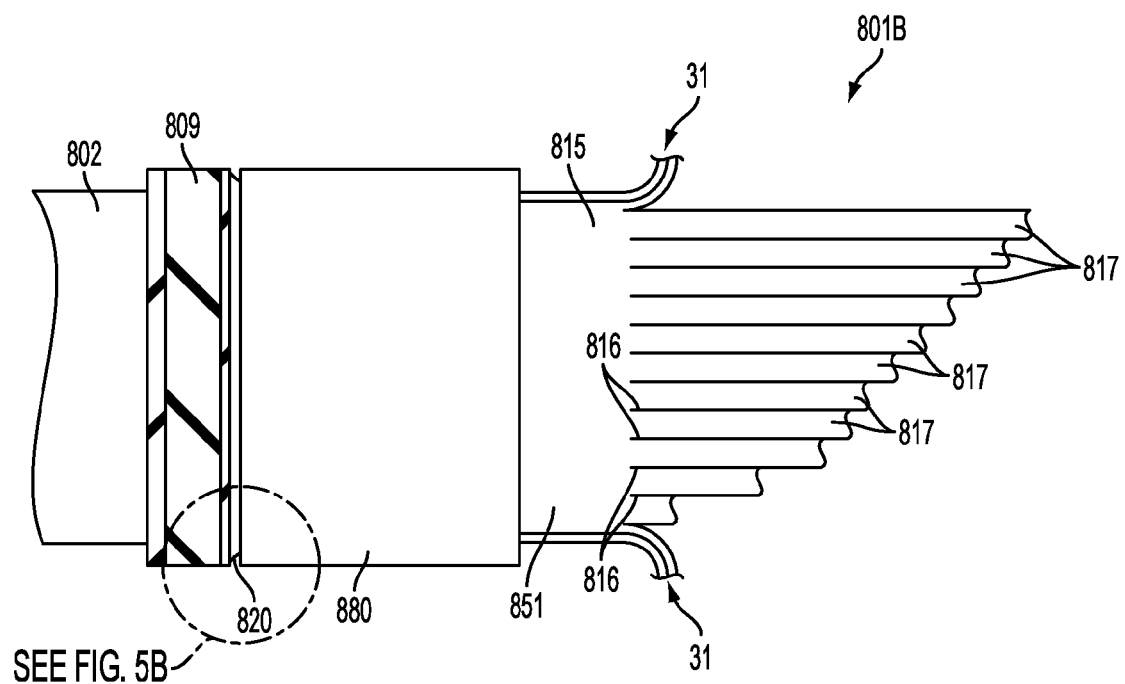
FIG. 5 is a diagrammatic top view of the apparatus for making composite cover material of FIG. 4.
Figure 5B:
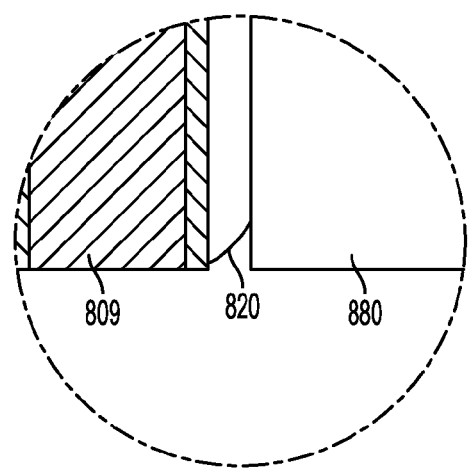

FIG. 5A shows a top view of the apparatus 801B. The material 802 advances across frame 890 (not shown). The applicator 809 dispenses an adhesive layer (not show) on the upper surface of the material 802. The material 802 with the adhesive layer thereupon are passed beneath a roller 880 which imparts a compressive force thereupon. The top or roller-side of the adhesive layer 820 may be smoothed or uniformly imprinted as it passed underneath the roller 880 forming a uniform or smooth adhesive layer surface 851 while the compressive force of the roller 880 may be sufficient to force adhesive into the interstitial spaces or gaps in the fabric backing of the material 802. The resulting composite sheet material 815 may be cut by cutter 816 to form the composite cover material 817 with a non-porous backing.

Figure 6:
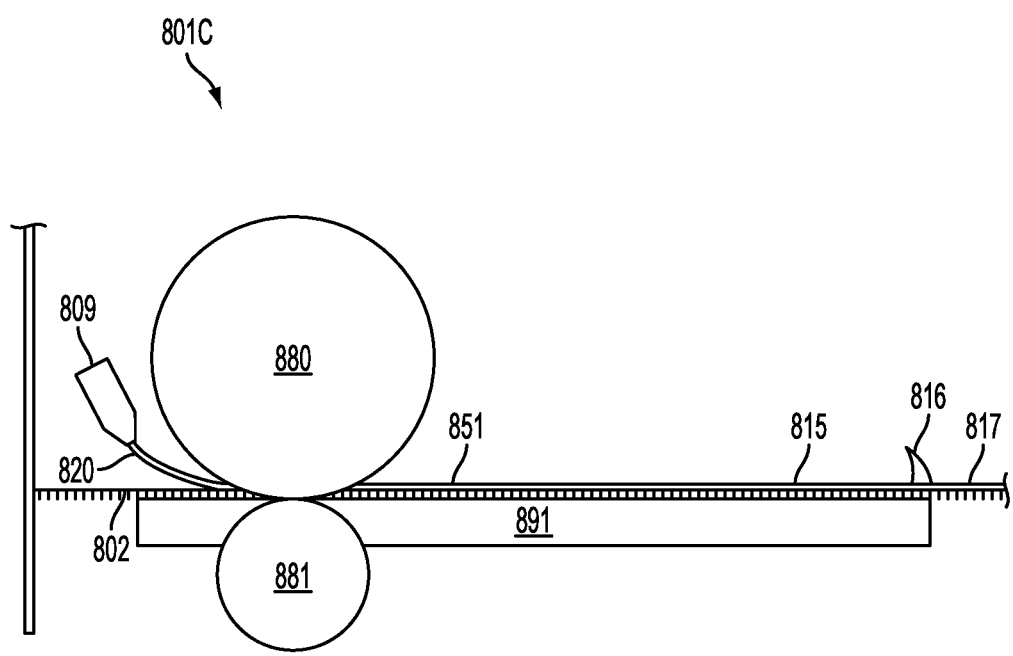
FIG. 6 is a side view diagrammatic representation of still another apparatus for making composite cover material in accordance with an embodiment of the present invention.

FIG. 6 shows an apparatus 801C that is a variation on the apparatus 801B shown in FIGS. 4 and 5A. More specifically, apparatus 801C additionally includes roller 881, that acts, together with roller 880, to impart a compressive force between the material 802 and the adhesive layer 820. The roller is shown in a modified frame 891 that allows for the rollers 880, 881 to act together as the material 802 and adhesive layer 820 pass beneath the upper roller 880.

As discussed above with respect to the roller 880, the roller 881 can be heated or cooled. It is thus possible to simultaneously heat or cool the rollers 880, 881. It is also possible to heat or cool one of the rollers, or to heat one of the rollers, while cooling the other.

In an embodiment, the upper roller 880 is cooled while the lower roller 881 is heated. Cooling the upper roller 880 may provide one or more of the following benefits: providing a smoother or crisper surface 851; hastening the setting of the adhesive, and thus the forming of the composite sheet material 815; improving the contact between the material 802 and the adhesive used to form the adhesive layer 820; and holding in place of the fibers comprising the pile of the material 802. While heating the lower roller 881 may aid in the penetration of the adhesive layer 820 into the interstitial spaces or gaps within the material 802 as the adhesive layer 820 passes above the roller 881.

Either or both of the rollers may also be operated at ambient temperature, and neither heated nor cooled.

Moreover, it is not necessary to modify the frame 890 shown in FIG. 4 to be like the frame 891 shown in FIG. 6 to operate rollers 880, 881 in order to keep within the scope of the present invention. As will be apparent to one of skill in the art, the rollers 880, 881 can be configured to be prior to, or after, an unmodified frame 891. The applicator 809 can be moved accordingly.

The rollers 880, 881 may be the same size, or of differing sizes. In an embodiment, the upper roller 880 is of a diameter that will allow it to adequately smooth or uniformly imprint the adhesive layer 820 to form the smoothed or uniform adhesive layer 851. In an embodiment, the upper roller 880 has a diameter between about 14" and 20". In an embodiment, the lower roller 881 is of a diameter that will permit it to operate with the upper roller 880. In an embodiment, the lower roller 880 has a diameter between about 5" and 20".

In an embodiment, instead of using a tenter to move the material, the rollers 880, 881 can drive the material therebetween.

Figure 7:
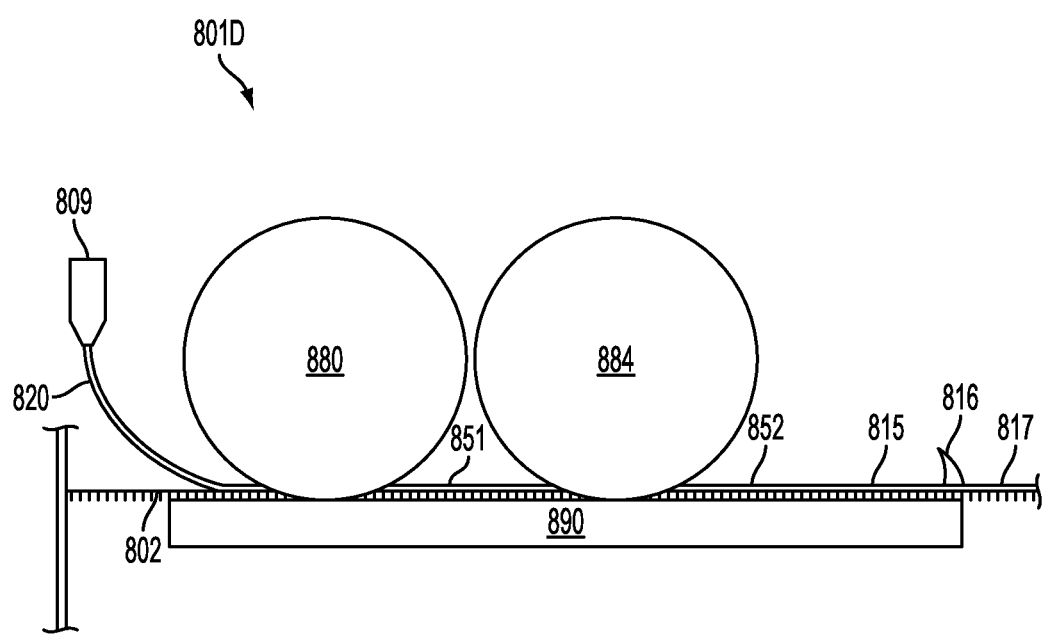
FIG. 7 is a side view diagrammatic representation of a further apparatus for making composite cover material in accordance with an embodiment of the present invention.

Turning now to FIG. 7, an apparatus 801D for forming the composite cover material 817 is shown. In an embodiment, the apparatus comprises an adhesive applicator 809 fed from a feeder (not shown) which gets a supply of adhesive from an adhesive supply (not shown). An advancing material 802 runs between a roller 880 and a surface 890 such as a flat portion of a tenter frame. The roller 880 may be urged toward the surface 890 by a spring, by gravity or by other means that will be apparent to persons skilled in the art.

An adhesive layer 820 leaves the applicator 809 and is sandwiched between the roller 880 and the material 802 prior to, or as the material passes beneath the roller 880. In an embodiment, the adhesive forming the adhesive layer 820 is predominantly polypropylene. The positioning of the applicator 809 may be varied. Where the adhesive forming the adhesive layer 820 is polypropylene, the applicator 809 may be the die head of an extruder. In such an embodiment, the adhesive has a viscosity as it exits the extruder that forms a sheet of molten polypropylene. In an embodiment, the applicator 809 may be placed at a distance to the location where the adhesive layer contacts the material 802 prior to contacting the roller 880 (as shown) or at substantially the same time it contacts the roller 880; or at another location, including where the adhesive layer 820 contacts the roller 880 before it contacts the material 802. Such variation is within the scope of this invention, and will be apparent to a person of skill in the art.

As the material 802 and the adhesive layer 820 pass between the roller 880 and the surface 890 they are urged together. The top or roller-side of the adhesive layer 820 is smoothed or uniformly imprinted as it passed underneath the roller 880 forming a uniform or smooth adhesive layer 851, while the contact between the adhesive and the material 802 under pressure from the roller 880 permits the adhesive layer 820 to fill interstitial spaces or gaps within the material 802. The material 802 and the uniform or smooth adhesive layer 851 may then be passed beneath a second roller 884 to form the resulting composite sheet material 815.

After the material 802 with the applied adhesive layer 820 pass between the roller 880 and the surface 890 forming the uniform or smooth adhesive layer 851, the combination is then passed beneath a second roller 884. As with the first roller 880, when the combination passes beneath the second roller 884 it is again urged together. The second roller 884 may also smooth or imprint the uniform or smooth adhesive layer 851, and in any event, will impart downward pressure upon it, which may permit the adhesive layer 820 to further fill interstitial spaces or gaps within the material 802. The resulting composite sheet material 815 may be cut by cutter 816 to form the composite cover material 817 with a non-porous backing.

One or both of the rollers 880, 884 may be heated or cooled, or one may be heated while the other is cooled.

Cooling one or both of the rollers 880 may provide one or more of the following benefits: providing a smoother external surface or crisper imprint; hastening the setting of the adhesive, and thus hastening the forming of the composite sheet material 815; improving the contact between the material 802 and the adhesive used to form the adhesive layer 820; and holding in place of the fibers comprising the pile of the material 802. Heating the rollers 880, 884 may aid in the penetration of the adhesive layer 820 into the interstitial spaces or gaps within the material 802 as the adhesive layer 820 passes beneath the rollers 880, 884 and may permit for better imprinting into, or smoothing of, the external surface of the adhesive layer 820.

Either or both rollers 880, 884 may also be operated without heating or cooling.

The diameter of each of the rollers 880, 881, and whether each of them are heated, or cooled, or neither heated nor cooled, depends upon the specific function desired for the roller. Such variations are within the scope of the present invention.

Figure 8:
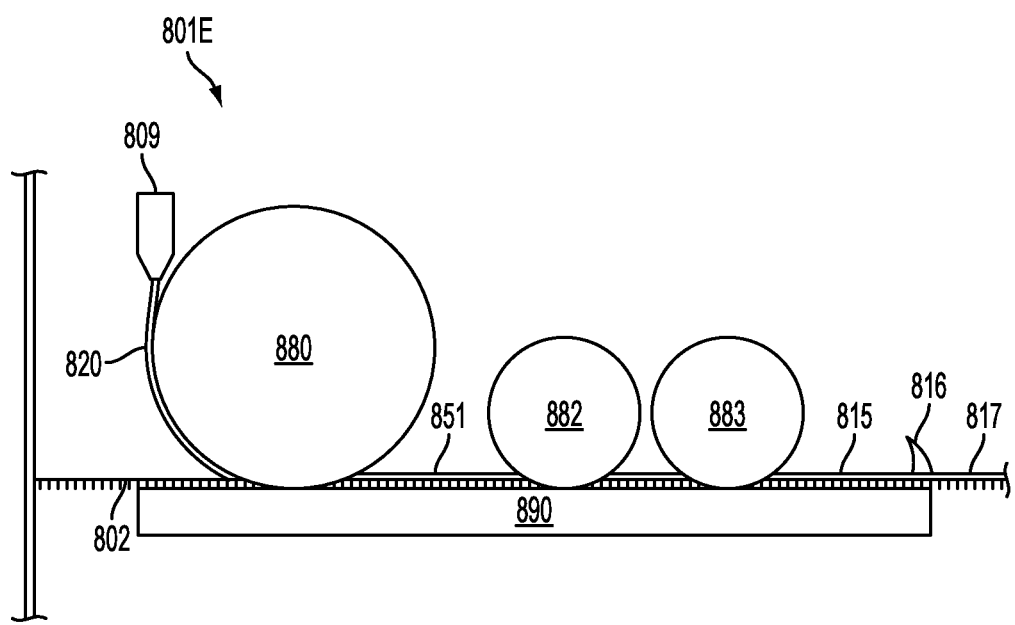
FIG. 8 is a side view diagrammatic representation of a still further apparatus for making composite cover material in accordance with an embodiment of the present invention.

FIG. 8 shows an apparatus 801E for forming the composite cover material 817. In an embodiment, the apparatus comprises an adhesive applicator 809 fed from a feeder (not shown) which gets a supply of adhesive from an adhesive supply (not shown). An advancing material 802 runs between rollers 880, 882, 883 and a surface 890 such as a flat portion of a tenter frame. The rollers 880, 882, 883 may be urged toward the surface 890 by a spring, by gravity or by other means that will be apparent to persons skilled in the art.

An adhesive layer 820 leaves the applicator 809 and falls upon the first roller 880. As the first roller 880 rotates, the adhesive layer 820 comes into contact with the material 802. The positioning of the applicator 809 may be varied. In an embodiment where the adhesive forming the adhesive layer 820 is polypropylene, the applicator 809 may be the die head of an extruder. In such an embodiment, the adhesive has a viscosity as it exits the extruder that forms a sheet of molten polypropylene. In an embodiment, the applicator 809 may be placed above the roller 880 such that it contacts the roller before the material 802 (as shown); or at another location where it will still make contact with the roller 880 before it contacts the material 802. Such variation is within the scope of this invention, and will be apparent to a person of skill in the art.

In an embodiment, the adhesive forming the adhesive layer 820 is polypropylene. As the material 802 and the adhesive layer 820 pass between the rollers 880, 882, 883 and the surface 890 they are urged together. As discussed above, each of the rollers 880, 882, 883 may be heated or cooled, or may be neither heated nor cooled. Also as discussed above, the rollers 880, 882, 883 may be of the same size, or of varying size. In an embodiment, the rollers 880 882, 883 are each in the range of 14" to 20". In an embodiment, the first roller 880 is in the range of 14" to 20", while the second and third rollers 882, 883 are smaller than the first roller 880, and are in the range of 10" to 18". Selection of the diameters and thermal characteristics of the rollers 880, 882, 883 may be to achieve desired results.

The composite sheet material 815 may be cut by cutter 816 to form the composite cover material 817 with a non-porous backing.

Figure 9:
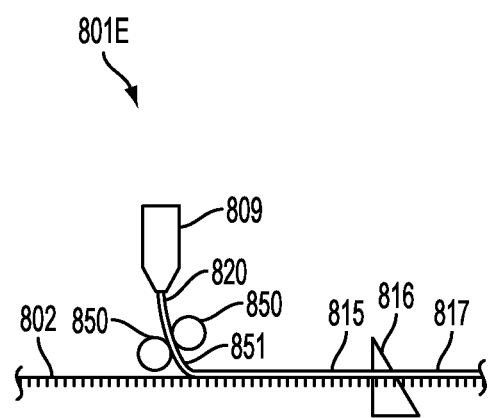
FIG. 9 is a side view diagrammatic representation of another further apparatus for making composite cover material in accordance with an embodiment of the present invention.

FIG. 9 shows an apparatus 801E for forming the composite cover material 817. In an embodiment, the apparatus comprises an adhesive applicator 809, a feeder and adhesive supply (not shown), rollers 850 and strip cutter 816. After the adhesive layer 820 leaves the applicator 809, but before it contacts the material 802, the rollers 850 smooth the adhesive layer 820 to form a smoothed adhesive layer 851. In an embodiment where the adhesive is polypropylene, although smoothed adhesive layer 851 may be cooler than it was leaving the applicator 809, it is still not hardened or set. Thus, after the smoothed adhesive layer 851 contacts the material 802, it can harden and set forming the composite sheet material 815. The composite sheet material 815 may be cut by cutter 816 to form the composite cover material 817 with a non-porous backing.

Figure 10:
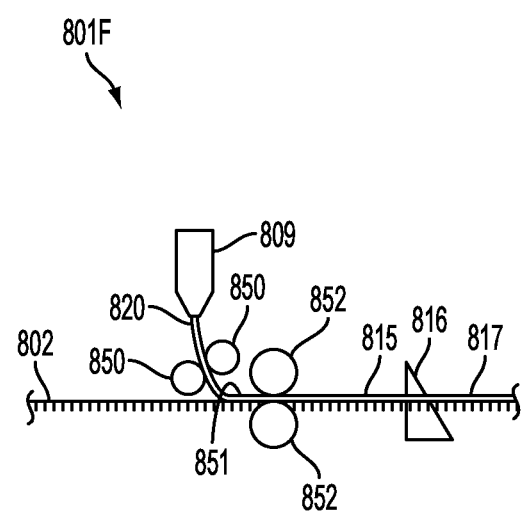
FIG. 10 is a side view diagrammatic representation of yet another further apparatus for making composite cover material in accordance with an embodiment of the present invention.

FIG. 10 shows an apparatus 801F for forming the composite cover material 817. In an embodiment, the apparatus comprises an adhesive applicator 809, a feeder and an adhesive supply (not shown), rollers 850, rollers 852 and strip cutter 816. After the adhesive layer 820 leaves the applicator 809, but before it contacts the material 802, the rollers 850 smooth the adhesive layer 820 to form a smoothed adhesive layer 851. In an embodiment where the adhesive is polypropylene, although smoothed adhesive layer 851 may be cooler than it was leaving applicator 809, it is still not hardened or set. After the smoothed adhesive layer 851 contacts the material 802, the rollers 852 apply a compressive force compressing the smoothed adhesive layer 851 and the material 802 together to form the composite sheet material 815. The rollers 852 may also be used to uniformly imprint the smoothed adhesive layer 851. The composite sheet material 815 may be cut by cutter 816 to form the composite cover material 817 with a non-porous backing.

In an embodiment, the rollers 852 are heated to a temperature hotter than the temperature of smoothed adhesive layer 851. In an embodiment, the rollers 852 are cooled to a temperature cooler than the temperature of the smoothed adhesive layer 851. In an embodiment, the rollers 852 are neither heated nor cooled. In an embodiment, one of the rollers 852 is heated while the other is cooled.

Figure 11:
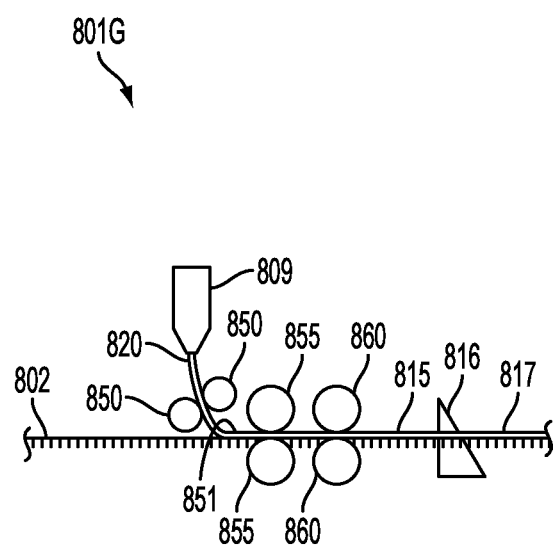
FIG. 11 is a side view diagrammatic representation of still another further apparatus for making composite cover material in accordance with an embodiment of the present invention.

FIG. 11 shows an apparatus 801G for forming the composite cover material 817. In an embodiment, the apparatus comprises an adhesive applicator 809, a feeder and an adhesive supply (not shown), three roller pairs 850, 855, 860 and strip cutter 816. After the adhesive layer 820 leaves the applicator 809, but before it contacts the material 802, the roller pair 850 may smooth the adhesive layer 820 to form a smoothed adhesive layer 851. In an embodiment the adhesive is predominantly polypropylene, and although smoothed adhesive layer 851 may be cooler than it was when leaving applicator 809, it is still not hardened or set. After the smoothed adhesive layer 851 contacts the material 802, the second roller pair 852 applies a compressive force compressing the smoothed adhesive layer 851 and the material 802 together while at the same time imparting heat to the combination. The third roller pair 860 thereafter applies a compressive force compressing the smoothed adhesive layer 851 and the material 802 together, while it may, at the same time, cool them. It is believed that the heating by rollers 852 may aid in filling interstitial spaces or gaps within the material 802 with contacting side of the smoothed adhesive layer 851, and that the cooling by the second cooling rollers 860 may hasten the setting of the smoothed adhesive layer. The resulting composite sheet material 815 may be cut by cutter 816 to form the composite cover material 817 with a non-porous backing.

Figure 12:
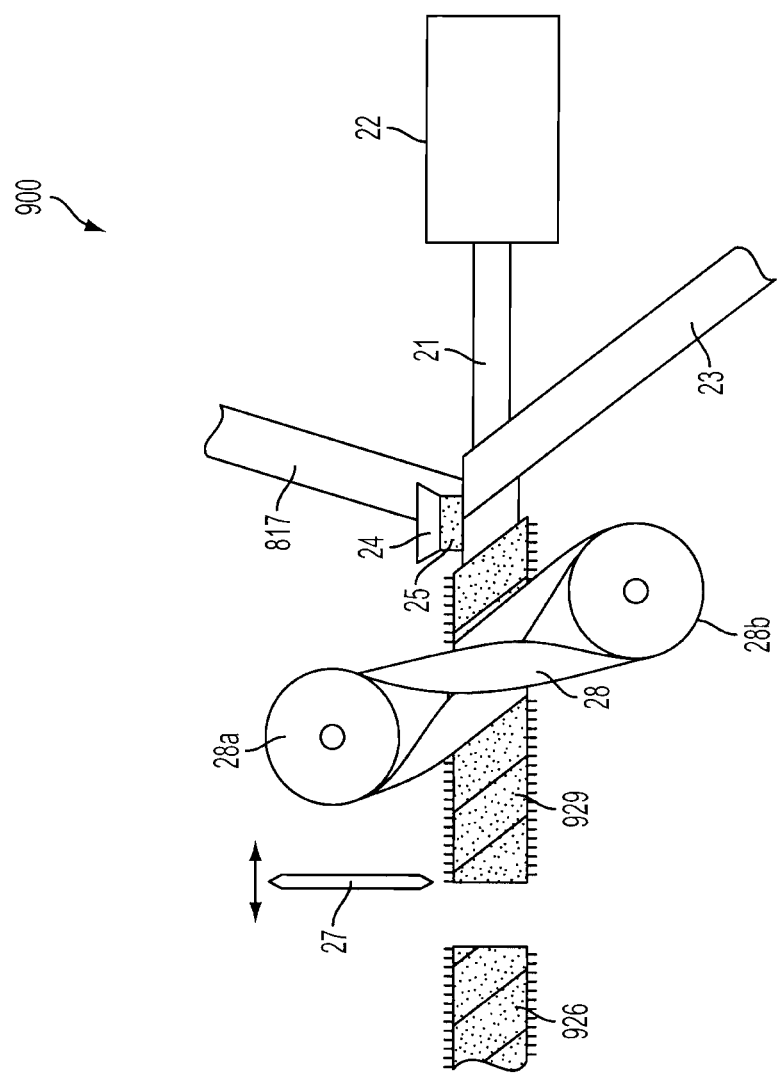
FIG. 12 is a diagrammatic representation of an apparatus for making laminated paint rollers using a composite cover material in accordance with an embodiment of the present invention.

FIG. 12 shows a diagrammatic representation of an apparatus 900 suitable for making laminated paint rollers in accordance with an embodiment of the invention. For ease of discussion in this application, the term "downstream" refers to the direction further along in the roller manufacturing process, or nearer the fly-away cutter 27, while the term "upstream" refers to the direction earlier in the roller manufacturing process, or further from the fly-away cutter 27.

Housing 22 supports mandrel 21. A cooler (not shown) can be used to cool the mandrel 21. In an embodiment, inner strip 23 is fed about the mandrel 21, so it winds helically. The term helically as used herein means oriented about a mandrel 21 so as to permit the upstream edge of a given wind of a strip or cover material to be in closely-spaced or abutting relation with the downstream edge of the preceding wind of the strip. A lubricant such as 5% mineral oil may be applied to the inner surface of the inner strip 23 prior to winding on the mandrel 21.

The head 24 provides a layer of adhesive material 25 from a source of such material (not shown), the adhesive material 25 may be polypropylene or a compound predominantly made of polypropylene. The source of adhesive material 25 may be an extruder, or may be another source of adhesive material, such as a melter. The head 24 may be any type of head appropriate for providing adhesive material 25 from the source, such as a nozzle or a die. Where the source of polypropylene adhesive material 25 is an extruder, the head 24 is preferably a die.

In an embodiment a single head 24 supplies an adhesive layer 25 to the outer surface of inner strip 23 as it rotates around the mandrel 21. Although the width of the adhesive layer may be varied, in an embodiment, the width of the adhesive layer 25 should substantially cover the outer surface of the inner strip 23. The width of the adhesive layer 25, however, may not completely cover the outer surface of the inner strip 23, or may be sufficient to excess adhesive over the amount required to completely cover the outer surface of inner strip 23. A strip of composite cover material 817 is advanced about the mandrel 21 outside of the inner strip 23 and adhesive layer 25. In an embodiment, composite cover material 817 comprises an outer surface of pile and a smooth or uniformly imprinted inner surface or backing made of polypropylene or a compound predominantly made of polypropylene.

The edges of the composite cover material 817 may be offset from the edges of the inner strip 23 as the two are advanced along the mandrel 21. It is believed that the a stronger product is yielded from having an offset between the edge of the composite cover material 817 and the edge of the inner strip 23. An offset of between about one-quarter and three-quarters of the width of the inner strip 23 is found to achieve acceptable results. Good results may be achieved by having an offset of about one-half of the width of the inner strip 23.

Prior to the hardening and setting of the adhesive material 25, an inwardly compressive force applies pressure to the outer pile surface of the composite cover material 817, imparting inward forces on the component parts, thus laminating the composite cover material 817 and the inner strip 23 as the adhesive layer 25 sets. The continuous roller 929 is thereby formed about the mandrel 21.

In an embodiment, the inwardly compressive force is a helical belt system formed from rollers 28a, 28b, and a belt 28. In addition to compressing the component parts and forming the roller, the belt 28 advances the thus-formed endless roller 929 along the mandrel 21 and continuously rotates the endless roller, thereby also advancing the inner strip 23 and the composite cover material 817 around and downstream on the mandrel 21.

The endless roller 929 may be cut by the fly-away saw 27, into lengths after it has sufficiently set. The fly-away saw 27 may be used to cut endless roller 929 into paint-roller sized lengths ready for finishing, or more typically into sticks 926 of a fixed length, such as 65", that may be further cut and finished into paint-rollers.

It is within the scope of the invention to apply the adhesive layer 25 to the outer surface of the inner strip 23, the inner smooth or imprinted surface of the composite cover material 817, or simultaneously to the smooth or imprinted inner surface of the composite cover material 817 and the outer surface of the inner strip 23, in any event, such that the adhesive layer 25 is sandwiched between the inner strip 23 and the composite cover material 817.

In an embodiment, the head 24 is a die head, and the adhesive layer 25 is predominantly or entirely from polypropylene. An extruder (not shown) forces the thermoplastic through the head 24, thereby dispensing a molten adhesive layer 25.

The present invention creates a laminated paint roller from a single strip of polypropylene 23 (or made predominantly of polypropylene), a single strip of composite cover material 817, and a single die head 24 that produces a layer of adhesive material 25 that is approximately as wide the width of the inner strip 23. The simple manufacturing line produces a laminated paint roller, with a low hoop force, which does not suffer from being out of round at its ends after being finished and cut. The lower hoop force can be demonstrated by slicing the a finished laminated paint roller lengthwise, and observing that it does not tend to open flat, but rather tends to keep its round shape as would an extruded plastic tube.

In an embodiment, the inner strip 23 has a width of 2¾ inches, and a thickness of between about 0.010" and 0.030"; the composite cover material 817 has approximately the same thickness, not counting the pile height, and a width of 2⅞ inches; and the adhesive layer may be between 0.010 inches and 0.030 inches. Thicknesses selected from the higher values in these ranges will provide paint rollers that have a more rigid feel, while thicknesses selected from the lower values in the ranges will provide a paint roller that has a softer feel. It is within the scope of the invention to independently select each of the thicknesses from these ranges. The width and thickness of the inner strip 23, and the width, non-pile thickness and pile thickness of the composite cover material 817 may be those that are appropriate for manufacture of the desired roller. For example, a typical high quality laminated roller having a 1.5-inch diameter core and a 75-wall can be manufactured with the following materials:

|  | Width | Non-pile Thickness | Pile Thickness |
| --- | --- | --- | --- |
| Inner Strip | 2.750" | 0.025" | N/A |
| Adhesive Layer | 2.750" | 0.020" | N/A |
| Composite cover material | 2.875" | 0.015" | Desired Pile |

As used herein, the term "wall" or "mil" means thickness in thousandths of an inch. Such widths and thickness and the methods of determining them will be apparent to one of skill in the art; almost infinite variation is possible depending upon the characteristics of the desired roller.

It is presently believed that the lamination process of the present invention will produce commercially acceptable rollers having a 1.5-inch diameter core manufactured with any of the following combinations of materials:

|  | Width | Non-pile Thickness | Pile Thickness |
| --- | --- | --- | --- |
| Inner Strip | 2.750" | 0.005" | N/A |
| Adhesive Layer | 2.750" | 0.010" | N/A |
| Composite cover material | 2.875" | 0.005" | Desired Pile | or

|  | Width | Non-pile Thickness | Pile Thickness |
| --- | --- | --- | --- |
| Inner Strip | 2.750" | 0.010" | N/A |
| Adhesive Layer | 2.750" | 0.020" | N/A |
| Composite cover material | 2.875" | 0.015" | Desired Pile | or

|  | Width | Non-pile Thickness | Pile Thickness |
| --- | --- | --- | --- |
| Inner Strip | 2.750" | 0.015" | N/A |
| Adhesive Layer | 2.750" | 0.015" | N/A |
| Composite cover material | 2.875" | 0.010" | Desired Pile |

Variations of this type with respect to the present invention will be apparent to one skilled in the art. The amount of adhesive required is expected to be less than may be required in a process bonding a polypropylene strip to cover material such as material 802 (FIG. 1, et seq.). This is expected because the adhesive layer bonds only two smooth (or uniform) non-porous layers rather than a smooth layer with a porous material.

In another embodiment (not shown), the composite cover material 817 can be directly fed from a machine producing it (e.g., the apparatus 801B in FIG. 4) into a paint roller manufacturing apparatus 900 for making laminated paint rollers. It is within the scope of the invention to combine multiple composite cover material 817 strips, such as, for example, using a fly-away to cutter to cut the composite cover material 817 into fixed-length sections, and using a fastening means to attach the ends of such fixed-length sections as the composite cover material 817 is consumed by the manufacturing of paint rollers using a paint roller manufacturing apparatus 900. In this manner, depending on the relative speed of the paint roller manufacturing apparatus 900, the machine producing the composite cover sheet 815 (see FIG. 4), the manufactured width of composite cover sheet 815 (see FIG. 4) and the desired width of composite cover material 817 (see FIG. 4), multiple paint roller manufacturing apparati 900 can be supplied from one apparatus 801B making composite cover material 817.

Figure 13:
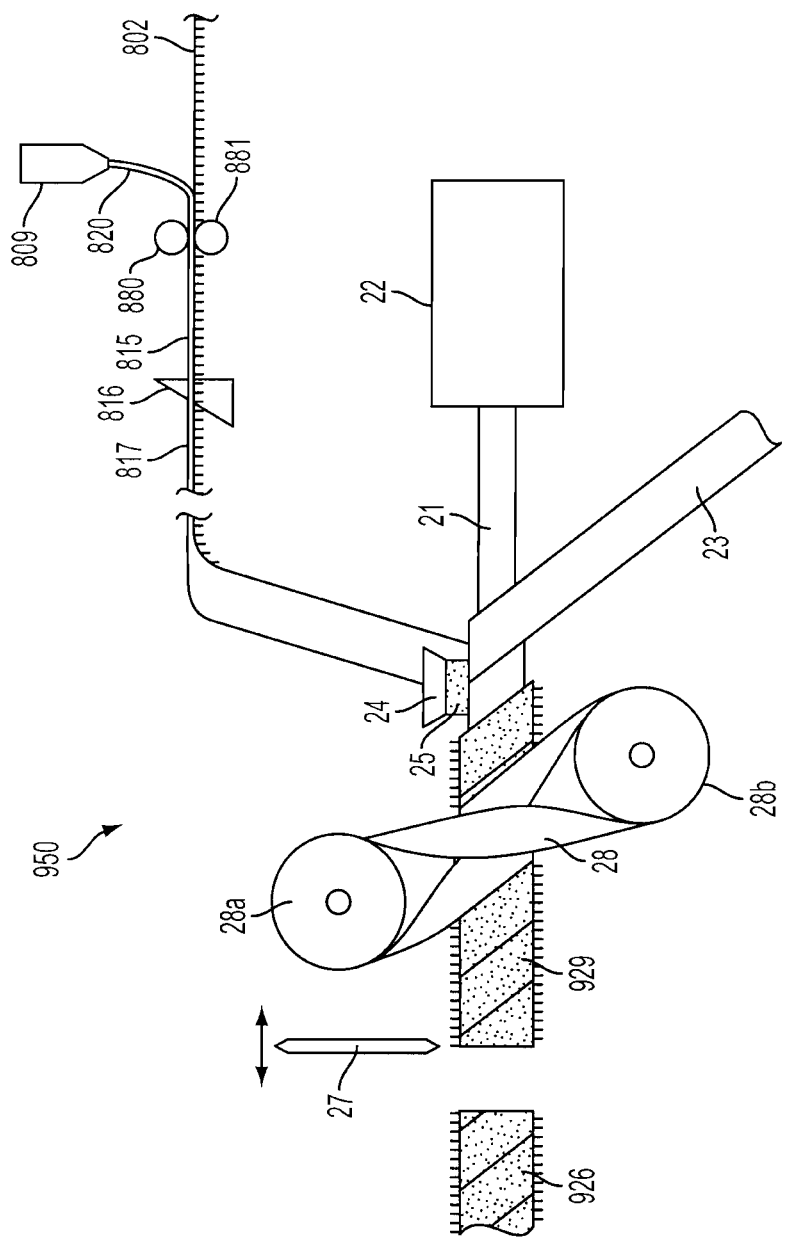
FIG. 13 is a diagrammatic representation of another apparatus for making laminated paint rollers using a composite cover material in accordance with an embodiment of the present invention.

FIG. 13 shows a diagrammatic representation of an apparatus 950 suitable for making laminated paint rollers in accordance with an embodiment of the invention. In an embodiment, the apparatus comprises a first adhesive applicator 809 having a feeder and an adhesive supply (not shown), rollers 880, 881 and a cutter 816. The composite cover material 817 is formed using a supply of pile material 802, having a pile side and a fabric side, and suitable for use manufacturing a paint roller cover. The pile material 802 is laid flat for processing. The material 802 may be sheared (not shown) on the pile side to attain a desired pile height prior to processing by the machine 950. The material 802 can be in any convenient width. In an embodiment, material 802 has a width of approximately 32".

In an embodiment, an adhesive layer 820 is applied to the fabric side of the material 802 by the adhesive applicator 809. The adhesive supply (not shown) supplies the adhesive to the applicator 809 by a feeder (not shown). In an embodiment, the adhesive is made predominantly or entirely from polypropylene resin, the adhesive applicator may be an extruder comprising a die head 809.

After the adhesive layer 820 is applied to the fabric side of the material 802, a compressive force urging the adhesive layer and the material 802 together is imparted by rollers 880, 881. The upper roller 880 smoothes and/or imprints the exterior surface of the adhesive layer forming a smoothed or imprinted layer 851. The thus-formed composite sheet material is then permitted to cool and set. Such cooling and setting can be hastened by a cooling system (not shown) which can impart cooling to the combined sheet material 815 by any method, including, without limitation, a cooled roller or the flow of cool air or other gas or fluids. In an embodiment, the adhesive layer 820 comprises predominantly or entirely polypropylene. The fibers in the material 802 are further held in place by the adhesive layer 820 after it has cooled and set.

Either before or after the applied adhesive layer 820 is completely set, the composite sheet material 815 is advanced toward a cutter 816. The cutter 816 is used to cut the composite sheet material into strips of composite cover material 817 having a pile side and a smooth and/or imprinted side predominantly or entirely made of polypropylene. In an embodiment, the strips of composite cover material are each approximately 2⅞ inches wide corresponding to a width of a cover strip that may be then used to manufacture paint rollers.

In an embodiment, eleven strips of composite cover material 817 each being 2⅞ inches wide are formed from a width of approximately 32" of the material 802. This width allows for a relatively small amount of waste on each side of the composite sheet material 815 as it is cut by the cutter 816 and thereby becomes composite cover material 817.

Although the composite cover material 815, or the strips of composite cover material 817 could be spooled and cut (not shown) for transportation to another site or another machine performing a manufacturing process for laminated paint rollers in accordance with the present invention, in an embodiment, the composite cover material 817 is fed directly to a mandrel 21. Housing 22 supports the mandrel 21. A cooler (not shown) can be used to cool the mandrel 21. In an embodiment, an inner strip 23 is made from or predominantly made from polypropylene. The inner strip 23 is feed about a the mandrel 21 so it winds helically.

The head 24 provides a layer of adhesive material 25 from a source of such material (not shown). The layer of adhesive material 25 is preferably polypropylene or made predominately from polypropylene. The polypropylene material is preferably supplied by an extruder (not shown) to head 24 that is a die.

In an embodiment a single head 24 dispenses a layer of adhesive material 25 to the outer surface of inner strip 23 as it rotates around the mandrel 21. Although the width of the layer of adhesive material may be varied, in an embodiment, the width the layer of adhesive material 25 should substantially cover the outer surface of the inner strip 21. The width of the layer of adhesive material 25, however, may not completely cover the outer surface of the inner strip 21, or may in an embodiment be sufficient to provide excess adhesive over the amount required to completely cover the outer surface of inner strip 21. The strip of composite cover material 817 is advanced from the cutter 816 toward, and then about the mandrel 21 outside of the inner strip 23 and the layer of adhesive material 25.

The edges of the composite cover material 817 may be offset from the edges of the inner strip 23 as the two are advanced along the mandrel 21. It is believed that a stronger product is yielded from having an offset between the edge of the composite cover material 817 and the edge of the inner strip 23. An offset of between about one-quarter (as shown) and three-quarters of the width of the inner strip 23 is found to achieve acceptable results. Good results are achieved by having an offset of about one-half of the width of the inner strip 23.

Prior to the hardening and setting of the layer of adhesive material 25, an inwardly compressive force applies pressure to the outer surface of the composite cover material 817, imparting inward forces on the component parts, thus laminating the composite cover material 817 and the inner strip 21 as the adhesive layer 25 sets. The continuous roller 929 is thereby formed about the mandrel 21.

In an embodiment, the inwardly compressive force is a helical belt system formed from rollers 28a, 28b, and a belt 28. In addition to compressing the component parts and forming the roller, the belt 28 advances the thus-formed endless roller 929 along the mandrel 21 and continuously rotates the endless roller, thereby also advancing the inner strip 23 and the composite cover material 817 around and downstream on the mandrel 817.

The endless roller 929 may be cut by the fly-away saw 27, into lengths after it has sufficiently set. The fly-away saw 27 may be used to cut endless roller 929 into paint-roller sized lengths ready for finishing, or more typically into sticks 926 of a fixed length, such as 65", that may be further cut and finished into paint-rollers.

It is within the scope of the invention to apply the adhesive layer 25 to the outer surface of the inner strip 23 (shown), the inner surface of the composite cover material 817 not shown, or simultaneously to the inner surface of the composite cover material 817 and the outer surface of the inner strip 23, in any event, such that the adhesive layer 25 is sandwiched between the inner strip 23 and the composite cover material 817.

Figure 14:
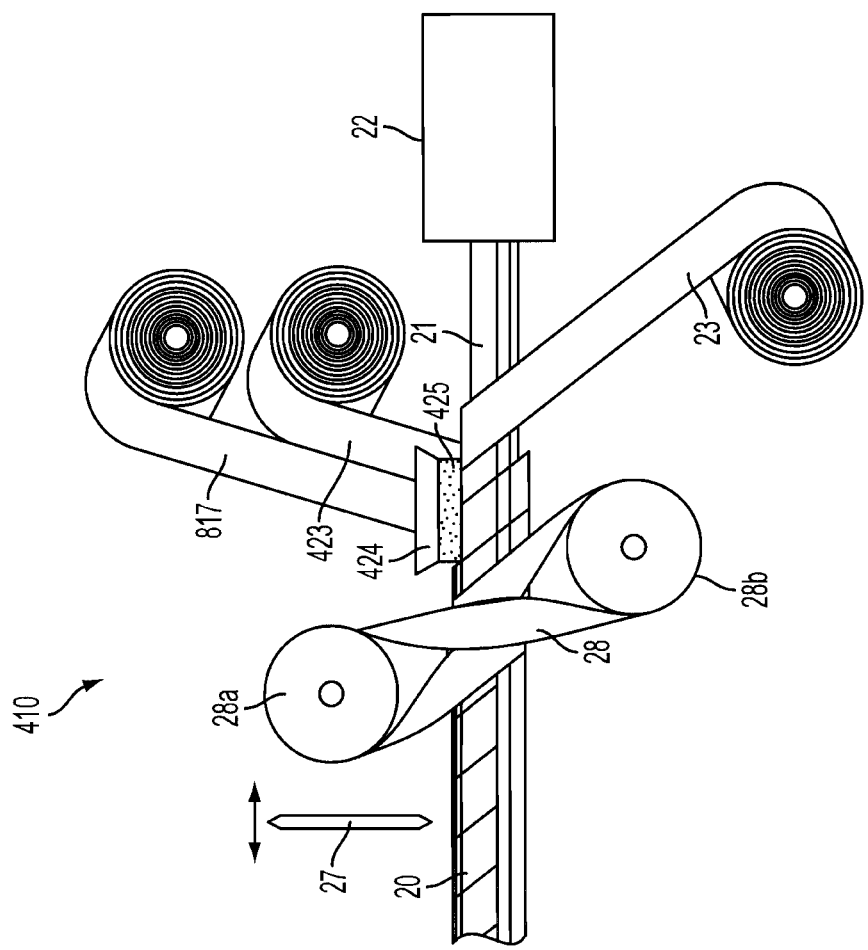
FIG. 14 is a diagrammatic representation of an apparatus suitable for making multi-strip laminated paint rollers using a composite cover material in accordance with an embodiment of the present invention.

FIG. 14 shows a diagrammatic representation of an apparatus 410 suitable for making laminated paint rollers in accordance with another embodiment of the invention. Housing 22 supports mandrel 21. A cooler (not shown) can be used to cool the mandrel 21. In an embodiment, inner strip 23 is fed about the mandrel 21, so it winds helically. A lubricant such as 5% mineral oil may be applied to the inner surface of the inner strip 23 prior to winding on the mandrel 21. Second strip 423 is feed about the mandrel 21 and inner strip 23, so it winds helically, and in offset relation to inner strip 23.

The head 424 provides a layer of adhesive material 425 from a source of such material (not shown), the adhesive material 425 preferably is or comprises predominately polypropylene. The source of adhesive material 425 is preferably an extruder, but may be any source of adhesive material including a melter. The head 424 may be any type of head appropriate for providing adhesive material 425 from the source, such as a nozzle or a die. Where the source of the adhesive material 425 is an extruder, the head 424 is preferably a die.

In an embodiment a single head 424 supplies an adhesive layer 425 to the outer surface of portions of two adjacent winds of inner strip 23 and to all or substantially all of one wind of second strip 423 as they rotate (helically) around the mandrel 21. The width of the adhesive layer may be varied, thus, in an embodiment, the width the adhesive layer 425 should substantially cover the outer surface of the second strip 423 and should cover approximately the same width on the outer surface of inner strip 23, albeit on two adjacent winds of inner strip 23. The width of the adhesive layer 425, however, may be insufficient to cover, or may result in some excess adhesive over the amount required to completely cover the outer surfaces of the strips 23, 423 as discussed. A strip of composite cover material 817 having a non-porous backing is advanced about the mandrel 21 outside of the second strip 423 and adhesive layer 425. In an embodiment, the generally non-porous backing of the composite cover material is made of, or made predominantly of, polypropylene. In an embodiment, the backing of the composite cover material 817 the may be generally smooth or may have a uniform imprint thereon.

The edges of the composite cover material 817 may be offset from the edges of the second strip 423 as they are advanced (helically) along the mandrel 21. It is believed that the a stronger product is yielded from having an offset between the edges of the non-porous layers, i.e., the composite cover material 817, the inner strip 23 and the second strip 423. An offset of between about one-quarter and three-quarters of the width of the inner strip 23 is found to achieve acceptable results. Good results can be achieved by having an offset of about one-third of the width of the inner strip 23 between each of the aforementioned non-porous layers.

Prior to the hardening and setting of the adhesive material 425, an inwardly compressive force applies pressure to the outer surface of the composite cover material 817, imparting inward forces on the component parts, thus laminating the composite cover material 817, the second strip 243 and the inner strip 23 as the adhesive layer 425 sets. The continuous roller 20 is thereby formed about the mandrel 21.

In an embodiment, the inwardly compressive force is a helical belt system formed from rollers 28a, 28b, and a belt 28. In addition to compressing the component parts and forming the roller, the belt 28 advances the thus-formed endless roller 20 along the mandrel 21 and continuously rotates the endless roller, thereby also advancing the strips 23, 423 and the composite cover material 817 around and downstream on the mandrel 21.

The endless roller 20 may be cut by the fly-away saw 27, into lengths after it has sufficiently set. The fly-away saw 27 may be used to cut endless roller 20 into paint-roller sized lengths ready for finishing, or more typically into sticks of a fixed length, such as 65", that may be further cut and finished into paint-rollers.

It is possible, without departing from the invention, to use more than one head to deposit the layer of adhesive material 25 between the composite cover material 817 and the second strip 423, and between the second strip 423 and the inner strip 23. Regardless of the width or number of heads, in order to produce a quality laminated continuous roller, pressure must be applied inwardly upon the composite cover material 817 before the layer of polypropylene is permitted to harden and set.

A benefit of certain embodiments of the instant invention is that a laminated roller can be produced using a narrow head and one strip and a composite cover material with a non-porous backing, and more specifically, with one non-porous polypropylene strip and one strip of a composite cover material having a non-porous backing. It is expected that such a process will be easy and cost efficient to operate, and will likely be able to produce rollers quickly. Another benefit of certain embodiments of the present invention is that it can create a laminated paint roller using a narrow head and one strip and a composite cover material with a non-porous backing without the rollers being out-of-round at its edges when they are finished and cut.

A benefit of certain embodiments of the instant invention is that it can create a high quality laminated roller by using a single head, two thin strips of polypropylene and a composite cover material with a non-porous backing.

Detailed Description Substantially as Filed in U.S. Patent Application Ser. No. 12/463,876

FIG. 12 shows a diagrammatic representation of a paint roller manufacturing apparatus 900. A strip of material 23 comprising polypropylene is wrapped helically about a mandrel 21 held on a base 22. The mandrel may be cooled by a cooler (not shown). An adhesive 25 comprising polypropylene is applied to an outer surface of the strip 23 by applicator 24. A cover 817 is wrapped around the mandrel 21 over the first strip 23 and the adhesive 25. A helical belt 28 driven by rollers 28a, 28b applies a compressive force on the cover material and advances the tubular assembly 929 down the mandrel 21. A flyaway saw 27 cuts the tubular assembly into lengths 926 that can be used, or cut and used to produce finished paint rollers.

Compound Adhesive

In an embodiment, the adhesive 25 is a compound of polypropylene and calcium carbonate having between 5% and 50% calcium carbonate by weight. In an embodiment the adhesive compound comprises at least 25% but not more than 45% calcium carbonate. In an embodiment the adhesive compound comprises at least 25% but not more than 33% calcium carbonate. In an embodiment, the calcium carbonate compounded with the polypropylene to form the compound adhesive 25 should be selected and/or processed to be relatively non-abrasive to the processing equipment.

In an embodiment, the applicator 24 applies a compound adhesive 25 formed by a twin screw extruder sufficient for compounding the calcium carbonate with polypropylene (not shown) from a supply of polypropylene resin in pellet form and a supply of calcium carbonate. When using a twin screw extruder, the calcium carbonate should be relatively non-abrasive to a extruder.

In an embodiment, the calcium carbonate compounded with the polypropylene to form the compound adhesive 25 should be used in a relatively fine, powdered form. In an embodiment the calcium carbonate may have a median particle size of 3 micrometers or less. In an embodiment, the calcium carbonate compounded with the polypropylene to form the compound adhesive 25 may be surface treated.

The cost by weigh of calcium carbonate is expected to be lower than the cost by weigh of polypropylene, thus the use of a compounded adhesive 25 as described will reduce the cost of manufacturing paint rollers.

The adhesive 25 made from a compound of polypropylene and calcium carbonate having between 5% and 50% calcium carbonate by weight is expected to have higher thermal conductivity that an adhesive made from polypropylene alone. Accordingly, an adhesive 25 made from a compound of polypropylene and calcium carbonate having between 5% and 50% calcium carbonate by weight is expected to cool and set faster than an adhesive made from polypropylene alone. As a result of the higher thermal conductivity, when the apparatus 900 is operated using an adhesive 25 made from a compound of polypropylene and calcium carbonate having between 5% and 50% calcium carbonate by weight, it is expected that the apparatus will operate at higher overall throughput than it would when using an adhesive 25 comprising more than 95% polypropylene.

Compound Strip Material

In an embodiment, the strip 23 is made of a compound of polypropylene and calcium carbonate having between 5% and 50% calcium carbonate by weight. In an embodiment the strip 23 comprises at least 25% but not more than 45% calcium carbonate. In an embodiment the strip 23 comprises at least 25% but not more than 33% calcium carbonate.

In an embodiment, the calcium carbonate compounded with the polypropylene to form the strip 23 should be a relatively fine, powdered form of calcium carbonate. In an embodiment the calcium carbonate compounded with the polypropylene to form the strip 23 should have a median particle size of 3 micrometers or less. In an embodiment, the calcium carbonate compounded with the polypropylene to form the strip 23 may be surface treated.

The cost by weigh of calcium carbonate is expected to be lower than the cost by weigh of polypropylene, thus the use of a strip 23 made from a compound of polypropylene and calcium carbonate will reduce the cost of manufacturing paint rollers made therewith.

The strip 23 made from a compound of polypropylene and calcium carbonate having between 5% and 50% calcium carbonate by weight is expected to have higher thermal conductivity that an adhesive made from polypropylene alone. Because of the higher thermal conductivity using a strip 23 made from a compound of polypropylene and calcium carbonate having between 5% and 50% calcium carbonate by weight, rather than a strip 23 made from more than 95% polypropylene, it is anticipated that the adhesive 25 will set faster, and thus, apparatus 900 will operate at higher overall throughput than it would when using a strip 23 comprising more than 95% polypropylene.

Cover Material

In an embodiment, the cover 817 has a fabric backing and a pile outer surface such as knitted or woven cover materials; such a fabric backing of the cover 817 comprises interstitial pores into which adhesive 25 may flow, especially when compressed by the belt 28. In an embodiment, the cover is made from a microfiber material; such a microfiber cover 817 also comprises interstitial pores into which adhesive 25 may flow, especially when compressed by the belt 28.

In an embodiment, the cover 817 has a pile or microfiber outer surface and a smooth or uniformly imprinted backing formed from polypropylene.

In an embodiment, the cover 817 has a pile or microfiber outer surface and a smooth or uniformly imprinted backing formed from a compound of polypropylene and calcium carbonate having between 5% and 50% calcium carbonate by weight. In an embodiment the cover 817 comprises at least 25% but not more than 45% calcium carbonate. In an embodiment the cover 817 comprises at least 25% but not more than 33% calcium carbonate.

In an embodiment, the calcium carbonate compounded with the polypropylene to form the backing of the cover 817 should be a relatively fine, powdered form of calcium carbonate. In an embodiment the calcium carbonate compounded with the polypropylene to form the backing of the cover 817 should have a median particle size of 3 micrometers or less. In an embodiment, the calcium carbonate compounded with the polypropylene to form the backing of the cover 817 may be surface treated.

The cost by weigh of calcium carbonate is expected to be lower than the cost by weigh of polypropylene, thus the use of the backing of the cover 817 made from a compound of polypropylene and calcium carbonate will reduce the cost of manufacturing paint rollers made therewith.

The backing of the cover 817 made from a compound of polypropylene and calcium carbonate having between 5% and 50% calcium carbonate by weight is expected to have higher thermal conductivity that an adhesive made from polypropylene alone. Because of the higher thermal conductivity using a cover 817 having a backing made from a compound of polypropylene and calcium carbonate having between 5% and 50% calcium carbonate by weight, rather than a backing made from more than 95% polypropylene, it is anticipated that the adhesive 25 will set faster, and thus, apparatus 900 will operate at higher overall throughput than it would when using a cover 817 having a backing comprising more than 95% polypropylene.

Use of Compounded Materials

Apparatus 900 may be operated according to the present invention using an adhesive 25 made of a compound of polypropylene and calcium carbonate having between 5% and 50% calcium carbonate by weight; using a strip 23 made of a compound of polypropylene and calcium carbonate having between 5% and 50% calcium carbonate by weight; and/or using a cover 817 having a backing made of a compound of polypropylene and calcium carbonate having between 5% and 50% calcium carbonate by weight. When more than one component is made of a compound of polypropylene and calcium carbonate having between 5% and 50% calcium carbonate by weight, the percentage of calcium carbonate used in the compound forming the adhesive 25, the strip 23 and the cover 817 backing may be the same, or may differ from one-another.

When compounding of polypropylene and calcium carbonate in any compound of between 5% and 50% calcium carbonate by weight, the calcium carbonate is not expected to melt. As discussed above, the resulting compounds are expected to have higher thermal conductivity. Variation in the amount of calcium carbonate are within the scope of the invention, and thus, it will be apparent to one of skill in the art that to some degree thermal conductivity can be controlled, or a desired thermal conductivity or range of thermal conductivity can be achieved by varying the percentage of calcium carbonate in the compound.

The compounds of polypropylene and calcium carbonate used in the adhesive 25, strip 23 and/or cover 817 are expected to have achieve other characteristics that, when compared to using polypropylene alone, are expected to include increased stiffness. Increased stiffness may give a paint roller a firmer or stiffer feel, which may improve its performance as a paint roller. Moreover, in many cases, stiffer or firmer paint rollers are sold at a higher price. It will be apparent to one of skill in the art that to some degree, stiffness can be controlled, or a desired stiffness or range of stiffness can be achieved by varying the percentage of calcium carbonate in the compound.

FIG. 4 shows an apparatus 801B for forming the composite paint roller cover 817 having a compound backing. The roller 880 is urged toward the frame 890 by a spring, by gravity or by other means that will be apparent to persons skilled in the art. A layer of compound adhesive 820 is dispensed by an applicator 809 onto a roller 880, and runs between the roller 880 and a frame 890, such as a tenter frame, or between the roller 880 and another roller (not shown). The layer of compound adhesive 820 dispensed onto roller 880 may be between 0.010" and 0.020". In an embodiment, the compound adhesive 820 is a compound of polypropylene and calcium carbonate having between 5% and 50% calcium carbonate by weight. In an embodiment the adhesive compound comprises at least 25% but not more than 45% calcium carbonate. In an embodiment the adhesive compound comprises at least 25% but not more than 33% calcium carbonate. The calcium carbonate should be relatively non-abrasive to the processing machinery.

The cover material 802 is advanced along the frame 890 with its pile side down, and moved beneath the roller 880. The cover material 802 may have a pile side and a fabric backing—the fabric backing being porous and having interstitial spaces sufficient to permit penetration of the compound adhesive 820. As the cover material 802 and the layer of compound adhesive 820 pass between the roller 880 and the surface of the frame 890 they are urged together. The roller-side of the compound adhesive 820 may be smoothed or uniformly imprinted (e.g., embossed) by the roller 880 as it passed underneath, thus forming a uniform or smooth adhesive layer surface 851.

In an embodiment, the roller 880 applies a compressive force to urge the compound adhesive 820 towards the cover material 802. In an embodiment, the compressive force is sufficient to force the compound adhesive 820 into the interstitial spaces within the fabric backing of the cover material 802. The resulting composite sheet material 815 may be cut by a cutter 816 to trim away any excess materials, and thus to form the compound composite cover material 817 with a non-porous backing.

In an embodiment, the roller 880 may be heated or cooled.

In an embodiment, the apparatus comprises an applicator 809 that applies a compound adhesive 820 formed by a twin screw extruder sufficient for compounding calcium carbonate with polypropylene (not shown) from a supply of polypropylene resin in pellet form and a supply of calcium carbonate. The calcium carbonate should be relatively non-abrasive to the twin screw extruder.

The positioning and angular orientation of the applicator 809 may be varied. In an embodiment, the applicator is angled between 30 degrees and 60 degrees from vertical and positioned within inches of the middle of the roller 880. In another embodiment the applicator 809 is within 30 degrees (+/−) of vertical, and is positioned to dispense adhesive such that the adhesive layer 820 first makes contact on the upper half of the roller 880. In yet another embodiment, the applicator 809 is within 30 degrees (+/−) of horizontal and is positioned to dispense adhesive such that the adhesive layer 820 first makes contact on the lower half of the roller 880. Variations in the angular orientation of the applicator 809, and its distance from and orientation around the roller are within the scope of the invention, and will be apparent to one skilled in the art.

FIG. 14 shows a paint roller manufacturing apparatus 410. A strip of material 23 comprising polypropylene is wrapped helically about a mandrel 21 held on a base 22. The mandrel may be cooled by a cooler (not shown). A second strip of material 423 comprising polypropylene is wrapped helically about the first strip 23. An adhesive 425 comprising polypropylene is applied to an outer surface of the strips 23, 423 by applicator 424. A cover 817 is also helically wrapped around the mandrel 21 over the strips 23, 423 and the adhesive 425. A helical belt 28 driven by rollers 28a, 28b applies a compressive force on the cover material and advances the tubular assembly 310 down the mandrel 21. A flyaway saw 27 may cut the tubular assembly 20 into lengths (not shown) that can be used, or further cut and used to produce finished paint rollers.

In an embodiment, the applicator 424 applies a compound adhesive 425 formed by a twin screw extruder sufficient for compounding the calcium carbonate with polypropylene (not shown) from a supply of polypropylene resin in pellet form and a supply of calcium carbonate. When using a twin screw extruder, the calcium carbonate should be relatively non-abrasive to a extruder.

Apparatus 410 may be operated according to the present invention using an adhesive 425 made of a compound of polypropylene and calcium carbonate having between 5% and 50% calcium carbonate by weight; using a strip 23 made of a compound of polypropylene and calcium carbonate having between 5% and 50% calcium carbonate by weight; using a second strip 423 made of a compound of polypropylene and calcium carbonate having between 5% and 50% calcium carbonate by weight; and/or using a cover 817 having a backing made of a compound of polypropylene and calcium carbonate having between 5% and 50% calcium carbonate by weight. When more than one component is made of a compound of polypropylene and calcium carbonate having between 5% and 50% calcium carbonate by weight, the percentage of calcium carbonate used in the compound forming the adhesive 425, the strip 23, the second strip 423 and the cover 817 backing may be the same, or may differ from one-another.

Variation in the amount of calcium carbonate are within the scope of the invention, and thus, it will be apparent to one of skill in the art that to some degree thermal conductivity can be controlled, or a desired thermal conductivity or range of thermal conductivity can be achieved by varying the percentage of calcium carbonate in one or more of the compounds. It will be apparent to one of skill in the art that to some degree, stiffness can be controlled, or a desired stiffness or range of stiffness can be achieved by varying the percentage of calcium carbonate in these compounds as well.

Figure 15:
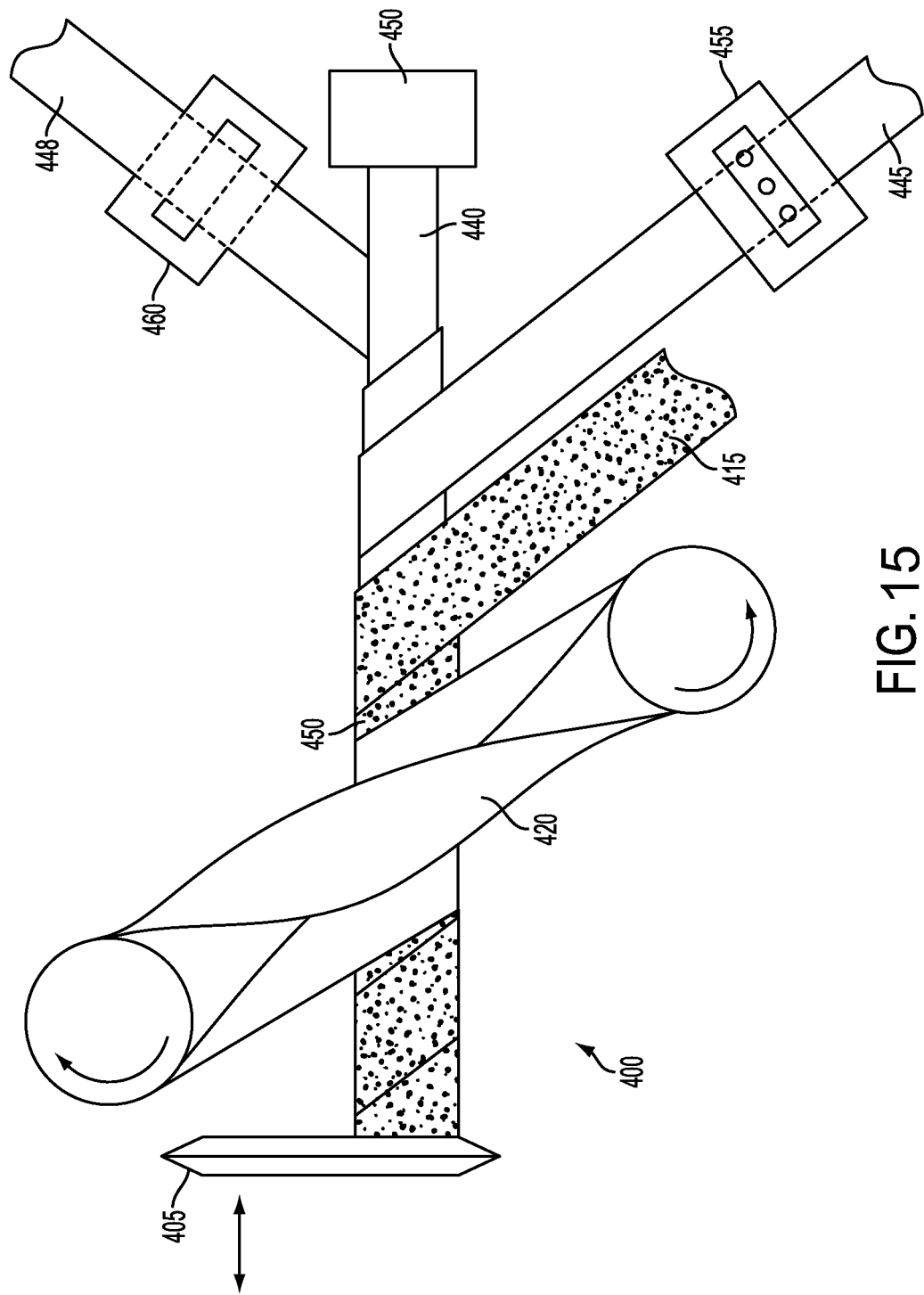
FIG. 15 is a diagrammatic representation of another paint roller manufacturing apparatus that can be used in accordance with an embodiment of the present invention.

FIG. 15 shows a paint roller manufacturing apparatus 400. A strip of material 448 comprising polypropylene is wrapped helically about a mandrel 440 held on a base 450. The mandrel may be cooled by a cooler (not shown). A second strip of material 445 comprising polypropylene is wrapped helically about the first strip 448. The heaters 460, 455 which may employ heating elements or heat by open flame, heat the outer surface (vis-à-vis the wrapping about the mandrel) of strips 448, 445 respectively. The heat produced by the heaters 460 is sufficient to cause the outer surface of the strips 448, 445 to become tacky, or to liquefy, or to become molten. (Although shown diagrammatically at a distance from the mandrel, in an embodiment, the heaters 460, 455 should be placed as close as practicable to the point where the strips 448, 445 contact the mandrel.) A cover 415 is also helically wrapped around the mandrel 440 over the outer surface of the second strip 445. A helical belt drive 420 applies an inwardly compressive force on the cover material 415 and advances the assembly down the mandrel 440. A flyaway saw 405 may cut the assembly into lengths (not shown) that can be used, or further cut and used to produce finished paint rollers.

Apparatus 400 may be operated according to the present invention using a strip 448 made of a compound of polypropylene and calcium carbonate having between 5% and 50% calcium carbonate by weight; using a second strip 445 made of a compound of polypropylene and calcium carbonate having between 5% and 50% calcium carbonate by weight; and/or using a cover 415 having a backing made of a compound of polypropylene and calcium carbonate having between 5% and 50% calcium carbonate by weight. When more than one component is made of a compound of polypropylene and calcium carbonate having between 5% and 50% calcium carbonate by weight, the percentage of calcium carbonate used in the compound forming the strips 448, 445 and the cover 415 backing may be the same, or may differ from one-another.

Variation in the amount of calcium carbonate are within the scope of the invention, and thus, it will be apparent to one of skill in the art that to some degree thermal conductivity can be controlled, or a desired thermal conductivity or range of thermal conductivity can be achieved by varying the percentage of calcium carbonate in one or more of the compounds. It will be apparent to one of skill in the art that to some degree, stiffness can be controlled, or a desired stiffness or range of stiffness can be achieved by varying the percentage of calcium carbonate in these compounds as well.

Figure 16:
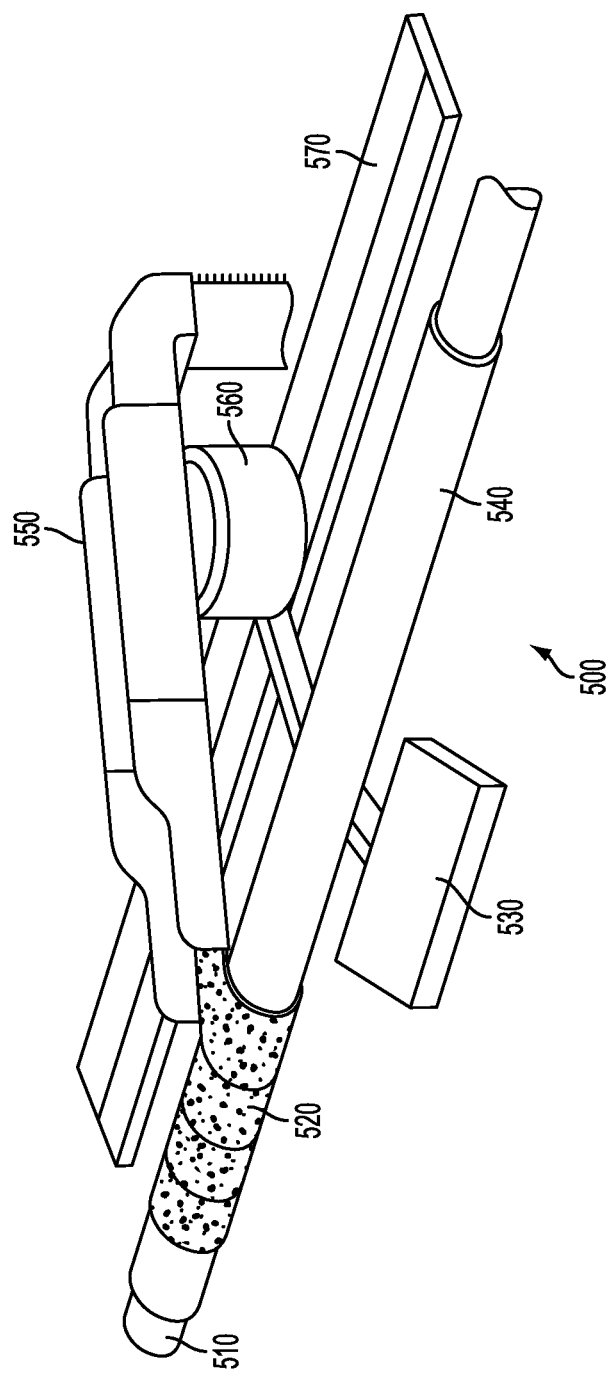
FIG. 16 is a diagrammatic representation of yet another paint roller manufacturing apparatus that can be used in accordance with an embodiment of the present invention.

FIG. 16 shows an apparatus 500 suitable for making paint rollers with a preformed core. The apparatus 500 comprises a rotating mandrel 510, a carriage 560 running on a stationary track 570 and supporting a cover material guide 550, and a heater 530. A preformed core 540 comprising polypropylene is placed about the mandrel 510. The heater 530 is activated, thereby heat softening the outer surface of the preformed core in an amount sufficient to bond to the backing of the cover 520. The cover 520 is wrapped helically about the core by the rotation of the mandrel and the movement of the carriage 560. The rotation of the mandrel 510 and the movement of the carriage 560 are such that the cover 520 is wrapped about substantially all of the preformed core 540.

Apparatus 500 may be operated according to the present invention using a preformed core 540 made of a compound of polypropylene and calcium carbonate having between 5% and 50% calcium carbonate by weight; and/or using a cover 520 having a backing made of a compound of polypropylene and calcium carbonate having between 5% and 50% calcium carbonate by weight. When more than one component is made of a compound of polypropylene and calcium carbonate having between 5% and 50% calcium carbonate by weight, the percentage of calcium carbonate used in the compound forming the core 540 and the cover 520 backing may be the same, or may differ from one-another.

Variation in the amount of calcium carbonate are within the scope of the invention, and thus, it will be apparent to one of skill in the art that to some degree thermal conductivity can be controlled, or a desired thermal conductivity or range of thermal conductivity can be achieved by varying the percentage of calcium carbonate in one or more of the compounds. It will be apparent to one of skill in the art that to some degree, stiffness can be controlled, or a desired stiffness or range of stiffness can be achieved by varying the percentage of calcium carbonate in these compounds as well.

It is possible, without departing from the invention, to use a compound of polypropylene and calcium carbonate having between 5% and 50% calcium carbonate by weight in lieu of polypropylene in making paint rollers. In light of this disclosure, other methods for the manufacture of the same will be apparent to persons of skill in the art.

Benefits of certain embodiments of the instant invention include: control of thermal conductivity in the component materials leading to faster throughput and/or faster set times; and control of material characteristics such as stiffness for manufacture of harder, more expensive paint rollers.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention, and has disclosed the ways the inventor now believes are the best ways to practice the invention. The above description and drawings are merely illustrative of the present invention and that changes in components, structure and procedure are possible without departing from the scope of the present invention as defined in the following claims.

Illustrative Embodiments Shown in the Figures of
U.S. Patent Application Ser. No. 12/463,876

In one embodiment, the invention is a method of making a paint roller. A strip of material is helically wound around a mandrel so as to form a helically wound strip. The strip is formed from a compound of polypropylene and calcium carbonate having between 5% and 50% calcium carbonate by weight. The wound strip is advanced along the mandrel. A layer of adhesive is applied onto an outer surface of the wound strip. A strip of cover material then is helically wrapped about the wound strip and over the layer of adhesive, thereby bonding the strip of cover material to the wound strip for forming the paint roller.

In another embodiment, the invention is method of making a paint roller. A strip of material is helically wound around a mandrel so as to form a helically wound strip. The wound strip is advanced along the mandrel. An adhesive is compounded from polypropylene and calcium carbonate. The compound comprises between 5% and 50% calcium carbonate by weight. The layer of adhesive is applied onto an outer surface of the wound strip. A strip of cover material then is helically wrapped about the wound strip and over the layer of adhesive, thereby bonding the strip of cover material to the wound strip for forming the paint roller.

In another embodiment, the invention is method of making a paint roller. A strip of material helically wound around a mandrel so as to form a helically wound strip. The strip is formed from a compound of polypropylene and calcium carbonate having between 5% and 50% calcium carbonate by weight. The wound strip is advanced along the mandrel. An adhesive is compounded from polypropylene and calcium carbonate. The compound comprises between 5% and 50% calcium carbonate by weight. The layer of adhesive is applied onto an outer surface of the wound strip. A strip of cover material then is helically wrapped about the wound strip and over the layer of adhesive, thereby bonding the strip of cover material to the wound strip for forming the paint roller.

In another embodiment, the invention is a method for continuously producing a multi-strip laminate paint roller. An inner strip and an outer strip of material is helically advanced about a mandrel in offset relation. At least one of the strips is formed from a compound of polypropylene and calcium carbonate having between 5% and 50% calcium carbonate by weight. A layer of adhesive is applied between the two strips and on the outer surface of the outer strip. Prior to permitting the layer of liquid polypropylene to harden and set, a cover is wrapped around the outer strip and a compressing force is applied upon the cover urging the cover and the two strips toward the mandrel, thereby creating the continuous laminated paint roller.

In another embodiment, the invention is a method for continuously producing a multi-strip laminate paint roller. An inner strip and an outer strip of material is helically advanced about a mandrel in offset relation. An adhesive material is compounded from polypropylene and calcium carbonate, the compound comprising between 5% and 50% calcium carbonate by weight. The adhesive material is applied between the two strips and on the outer surface of the outer strip. Prior to permitting the adhesive material to harden and set, a cover is wrapped around the outer strip and a compressing force is applied upon the cover urging the cover and the two strips toward the mandrel, thereby creating the continuous laminated paint roller.

In another embodiment, the invention is a method for continuously producing a multi-strip laminate paint roller. An inner strip and an outer strip of material is helically advanced about a mandrel in offset relation, at least one of the strips being formed from a compound of polypropylene and calcium carbonate having between 5% and 50% calcium carbonate by weight. An adhesive material is compounded from polypropylene and calcium carbonate. The compound comprises between 5% and 50% calcium carbonate by weight. The adhesive material is applied between the two strips and on the outer surface of the outer strip. Prior to permitting the layer of liquid polypropylene to harden and set, a cover is wrapped around the outer strip and a compressing force is applied upon the cover urging the cover and the two strips toward the mandrel, thereby creating the continuous laminated paint roller.

In another embodiment, the invention is a method of making a composite cover material. A first width of pile material is advanced. The pile material has a pile side and a fabric backing, wherein the fabric backing is porous, having interstitial spaces or gaps. An adhesive is compounded from polypropylene and calcium carbonate. The compound comprises between 5% and 50% calcium carbonate by weight. A layer of the adhesive is applied to the fabric backing of the pile material. The adhesive layer is allowed to set to form a composite sheet material having a pile side and a non-porous backing. The composite sheet material is longitudinally cut to form one or more strips of composite cover material in a second width. The formed composite cover material has an inner surface and an outer surface, the outer surface comprising a pile, and the inner surface comprising a non-porous layer bonded thereto.

In another embodiment, the invention is a method of making a paint roller having one or more materials making up its core. An adhesive material is compounded from polypropylene and calcium carbonate. The compound comprises between 5% and 50% calcium carbonate by weight. The adhesive material is applied between a cover material and one or more materials making up the paint roller core. The adhesive material is permitted to harden and set, thereby creating the paint roller.

In another embodiment, the invention is a method of making a laminated paint roller. A strip comprising polypropylene is helically wound around a mandrel so as to form a helically wound strip, the strip having an outer surface. The wound strip is helically advanced along the mandrel. A layer of adhesive comprising polypropylene is applied onto the outer surface of the wound strip. A strip of composite cover material is then wrapped about the wound strip and over the layer of adhesive. The composite cover material is formed by method comprising the following steps. A width of porous pile material is provided having a pile side and an fabric underside. The width of pile material is advanced with the fabric underside facing up. A backing layer is compounded from polypropylene and calcium carbonate, the compound comprising between 5% and 50% calcium carbonate by weight. The backing layer is applied on the fabric underside of the advancing width of pile material so that the layer has one side that is in contact with the fabric underside of the advancing material and an other side that is not in contact with the advancing pile material, the layer being in molten form when it is applied. A compressive force is applied to the other side of the layer before the layer hardens and sets, to smooth the other side of the layer of polypropylene, and to urge the layer and the fabric underside of the pile material together, thereby forming a composite material having a smooth or uniformly imprinted non-porous side and a pile side, and wherein the pile is held fast on the composite material. The width of composite material is cut into a strip once the backing layer is no longer in molten form, thereby forming a composite cover material having an inner surface comprising a smooth or uniformly imprinted non-porous polypropylene side and a pile side. The composite cover material produced by the method described above is then used to form a laminated pain roller. A compressive force is applied from without the composite cover material to urge the composite cover material, the layer of adhesive and strip of non-porous polypropylene material together, thereby laminating the smooth inner surface of the composite cover material to the outer surface of the non-porous polypropylene strip.

In another embodiment, the invention is a method of making a laminated paint roller. An inner strip of thermoplastic material is helically around a mandrel so as to form a helically wound inner strip, the inner strip having an outer surface. A second strip of thermoplastic material is helically wound around a mandrel in offset relation to the inner strip, so as to form a helically wound second strip, the second strip having an inner surface and an outer surface. The wound inner and second strips are advanced along the mandrel. An adhesive is compounded from polypropylene and calcium carbonate, the compound comprising between 5% and 50% calcium carbonate by weight. A layer of the adhesive is applied onto the outer surface of the wound inner strip and the outer surface of the wound second strip. A strip of composite cover material is then wrapped about the wound second strip and over the layer of adhesive applied to the wound second strip. The composite cover material has an inner surface and an outer surface, the outer surface comprising a pile fabric, and the inner surface comprising a smooth generally non-porous backing comprising polypropylene. A compressive force is then applied from without the composite cover material to urge the composite cover material, the layer of adhesive and inner and second strips together, thereby laminating the inner surface of the composite cover material to the outer surface of the second strip and laminating the inner surface of the second strip to the outer surface of the inner strip.

In another embodiment, the invention is a method for continuously producing a multi-strip laminate paint roller. An inner strip and an outer strip of material is helically advanced about a mandrel in offset relation. At least one of the strips is formed from a compound of polypropylene and calcium carbonate having between 5% and 50% calcium carbonate by weight. The inner strip and the outer strip have an outer surface facing away from the mandrel. The outer surface of the inner and outer strips is heated to cause a layer of the outer surface of the strips to become liquefied. Prior to permitting the liquefied layers to harden and set, a cover around is wrapped around the outer strip and a compressing force is applied upon the cover urging the cover and the two strips toward the mandrel, thereby creating the continuous laminated paint roller.

In another embodiment, the invention is a cold core method of making a paint roller from a cold, hard, preformed hollow core of thermoplastic material of a predetermined length in which the cold hard hollow core and its associated cover are forged together to form a single unitary body. A cold hard hollow core is provided. The cold hard hollow core is formed from a compound of polypropylene and calcium carbonate having between 5% and 50% calcium carbonate by weight. A mandrel having an external diameter is provided. The mandrel slidably receives and makes contact with the cold hard hollow core. The cold hard hollow core is rotated. The exterior surface of the cold hard hollow thermoplastic rotating core is heated, by application of a single source of heat, to a temperature high enough to cause subsequently applied cover to adhere to said exterior surface. A cover is then to the heated exterior surface of the cold hard hollow thermoplastic core, thereby bonding the cover to the heated exterior surface thereof, and forming a paint roller.

Further Observations

In experimenting with various ratios and materials, several further observations have been made, and the inventions of such further observations and additional embodiments are hereinafter presented, in addition to those discussed above. Polypropylene identified as 3462-US, 4920WZ-US and 6823MZ-US from Total Petrochemicals of Houston, Tex. was used for experimentation. MFI reported herein for the polypropylene resin is as understood from Total Petrochemicals literature.

Calcium Carbonate

The use of non-refined calcium carbonate in combination with polypropylene, e.g., calcium carbonate that has not been surface treated, adds strength to the resulting paint roller product when compared to a combination of refined calcium carbonate in combination with polypropylene. Thus, in an embodiment, the calcium carbonate compounded with the polypropylene to form the compound adhesive 25 (FIG. 12) may be a non-refined calcium carbonate. In an embodiment, the non-refined calcium carbonate is used in a relatively fine, powdered form. In an embodiment the calcium carbonate may have a median particle size of 3 micrometers or less.

In an embodiment, a twin screw extruder (not shown) may be used to compound non-refined calcium carbonate and polypropylene together to form the compound adhesive 25. The twin screw extruder may accept a supply of polypropylene resin in pellet form and a separate supply of calcium carbonate.

Ratio and Composition of Compound Adhesive

Experimentation was performed concerning the ratio of calcium carbonate—a ratio earlier thought to be preferred between 5% and 50% calcium carbonate by weight. As discussed above, the cost by weigh of calcium carbonate is generally lower than the cost by weigh of polypropylene, thus, the raw material cost of a compounded adhesive will be reduced as the ratio of calcium carbonate rises. Typically, today, the cost of polypropylene resin may be $0.64 per pound, while the cost of appropriate calcium carbonate may be $0.09 per pound. Using those typical costs, the raw materials required to make a compounded adhesive comprising 5% calcium carbonate by weight is approximately $0.6125 per pound; the raw materials required to make a compounded adhesive comprising 50% calcium carbonate by weight is approximately $0.365 per pound; and the raw materials required to make a compounded adhesive comprising 60% calcium carbonate by weight is approximately $0.31 per pound. While the process of compounding the materials itself has a cost, the large factors in savings are: (i) the disparity between the cost of the polypropylene resin and the calcium carbonate; and (ii) the percentages of calcium carbonate that can be used.

Experimentation was performed and acceptable results were found using a compounded adhesive 25 (see FIG. 12) made from polypropylene resin with approximately 60% calcium carbonate by weight. In an embodiment, adhesive 25 is a compound of polypropylene and calcium carbonate having between 50% and 66% calcium carbonate by weight. In an embodiment an adhesive compound 25 comprises at least 55% but not more than 65% calcium carbonate. In an embodiment an adhesive compound 25 is a compound of polypropylene and calcium carbonate having approximately 60% calcium carbonate by weight.

Experimentation was performed and acceptable results were found using a compounded adhesive 425 (see FIG. 14) made from polypropylene resin with approximately 56% calcium carbonate by weight. In an embodiment, an adhesive 425 is a compound of polypropylene and calcium carbonate having at least 50%, but less than 60% calcium carbonate by weight. In an embodiment an adhesive compound 425 is a compound of polypropylene and calcium carbonate having approximately 56% calcium carbonate by weight.

Polypropylene resin 6823MZ-US in pellet form used to create adhesive first used for the further testing had a melt flow index ("MFI") of approximately 32. For the further testing, the 32 MFI resin was compounded with a 60% mixture of calcium carbonate to form the compound adhesive 25. The resulting compound adhesive 25 had an MFI of approximately 14.4. Although the compound adhesive could be extruded through applicator 24, the low MFI appeared to cause the extruded to struggle, and the extruded material was highly viscous. The paint rollers resulting from the foregoing compound appeared to be substantially stronger when non-refined calcium carbonate was used rather than surface treated calcium carbonate. When the same 32 MFI resin was compounded with the same 60% mixture of calcium carbonate to form the compound adhesive 425 (see FIG. 14), it appeared that the MFI of the compound adhesive 425 was too high to permit a smooth flow from the applicator 424.

Polypropylene resin 4920WZ-US was tried. Polypropylene resin 4920WZ-US in pellet form used to create adhesive next used for the further testing had a melt flow index ("MFI") of approximately 105. For the next test, the 105 MFI resin was compounded with a 60% mixture of calcium carbonate to form the compound adhesive 25. The resulting compound adhesive 25 had an MFI of approximately 28.8. Using the 105 MFI resin, the compound adhesive 25 was extruded through applicator 24 without substantial stress on the extruder as the compounded adhesive 25 was of appropriate viscosity for use with the applicator 24. Again, the paint rollers resulting from the foregoing compound was substantially stronger when non-refined calcium carbonate was used rather than surface treated calcium carbonate. When the same 105 MFI resin was compounded with the same 60% mixture of calcium carbonate to form the compound adhesive 425 (see FIG. 14), it again appeared that the MFI was too high to permit a smooth flow from the applicator 424.

As the vendor did not have polypropylene resin available with an MFI higher than 105, for the following test, the 105 MFI resin was compounded with a 56% mixture of calcium carbonate to form the compound adhesive 425. The resulting compound adhesive 425 had an MFI of approximately 32. Using the 105 MFI resin, the compound adhesive 425 was extruded through applicator 424 without substantial stress on the extruder as the compounded adhesive 425 was of appropriate viscosity for use with the applicator 424. As before, the paint rollers resulting from the foregoing compound appeared to be substantially stronger when non-refined calcium carbonate was used rather than surface treated calcium carbonate. As an alternative to reducing ratio of calcium carbonate to 56%, the use of a polypropylene resin having a higher MFI, such as an MFI of approximately 120, with 60% calcium carbonate would have achieved acceptable results.

Composition of Strips

As with composite adhesives 25, 425, strip material 23, 423, 445, 448 can be manufactured using a compound of polypropylene and calcium carbonate. In an embodiment, a strip 23, 423, 445, 448 is cut lengthwise from a sheet material (not shown) that is manufactured using a compound of polypropylene and calcium carbonate. In an embodiment, the thickness of the sheet material is determined by successive rollers. Because rollers are used to control thickness, the MFI of the polypropylene/calcium carbonate compound may be substantially lower than that of the MFI required for use a compound adhesives 25, 425. In an embodiment, 4.1 MFI polypropylene resin 3462-US is compounded with approximate 60% by weight of calcium carbonate. The resulting polypropylene/calcium carbonate compound, having an MFI of approximately 2, can be run through successive rollers to reach a desired thickness. Almost any desired strip thickness can be attained. In an embodiment, a sheet of polypropylene/calcium carbonate compound material having thickness of approximately 10 mil, 15 mil, 20 mil or 25 mil can be cut longitudinally into one or more strip 23, 445, 448.

In an embodiment, the calcium carbonate used in manufacturing sheet material which can be cut into strips is non-refined calcium carbonate.

Composite Cover Material

Returning to FIG. 4, an apparatus 801B is shown for forming the composite paint roller cover 817 having a compound backing. A layer of compound adhesive 820 is dispensed by an applicator 809. The layer of compound adhesive 820 dispensed may be dispensed onto roller 880 or directly onto cover material 802. In an embodiment, the layer of compound adhesive 820 is between 0.010" and 0.020". In an embodiment, the compound adhesive 820 is a compound of polypropylene and calcium carbonate having at least 50%, and not more than 66% calcium carbonate by weight. The MFI of polypropylene/calcium carbonate compound the may be varied by changing using a polypropylene resin having a higher or lower MFI, as well as by varying the ratio of calcium carbonate. Using polypropylene resin having a higher MFI will cause the polypropylene/calcium carbonate compound to have a higher MFI when using the same ratio of calcium carbonate. Similarly, the MFI of the resulting compound can be lowered by reducing the percentage of calcium carbonate used in the polypropylene/calcium carbonate compound. In view of the foregoing, it will be apparent to one of skill in the art how to the MFI of polypropylene/calcium carbonate compound layer 820 can be varied so as to permit it to be dispensed appropriately by an applicator 809.

In an embodiment, the cover material 802 has a pile side and a fabric backing—the fabric backing being porous and having interstitial spaces sufficient to permit penetration of compound adhesive 820. In an embodiment, the compound adhesive 820 has an MFI higher than 2. In an embodiment, the compound adhesive 820 has an MFI between 14 and 105. In an embodiment, an MFI of in or around the mid 70's is desired to permit the compound 820 to properly permeate the fabric backing of the cover material 802. To obtain compound adhesive 820 having an MFI in or around the mid-70's 105 MFI polypropylene resin is compounded with 25% calcium carbonate by weight.

In an embodiment, the apparatus comprises an applicator 809 that applies a compound adhesive 820 formed by a twin screw extruder sufficient for compounding calcium carbonate with polypropylene (not shown) from a supply of polypropylene resin in pellet form and a supply of calcium carbonate to produce a compound that includes at least 50% calcium carbonate by weight.

Illustrative Paint Rollers

Returning to FIG. 12, in an embodiment, a strip 23 comprises polypropylene, and has a thickness of between 10 mil and 40 mil. In an embodiment, the strip 23 is approximately 10 mil, 15 mil, 20 mil or 25 mil thick. In an embodiment, the strip 23 may be of another suitable thickness.

In an embodiment, the strip 23 is made from a polypropylene/calcium carbonate compound comprising at least 50%, but not more than 66% calcium carbonate by weight. In an embodiment, the strip 23 is made from a polypropylene/calcium carbonate compound comprising approximately 60% calcium carbonate by weight. The strip 23 made from a polypropylene/calcium carbonate compound comprising at least 50% calcium carbonate by weight, is expected to have higher thermal conductivity than a strip made from polypropylene alone, or than a strip made from a polypropylene/calcium carbonate compound comprising less than 50% calcium carbonate by weight. Because of the higher thermal conductivity using a strip 23 made from a compound of polypropylene and calcium carbonate comprising at least 50% calcium carbonate by weight, it is anticipated that the adhesive 25 will set faster, and thus, apparatus 900 will operate at higher overall throughput than it would when using a strip 23 comprising more than 50% polypropylene.

In an embodiment, adhesive 25 comprises polypropylene, and is applied in a layer having a thickness of between 10 mil and 40 mil. In an embodiment, the layer of adhesive 25 is approximately 10 mil, 15 mil, 20 mil or 25 mil thick. In an embodiment, the layer of adhesive 25 is another suitable thickness.

In an embodiment, the adhesive 25 is made from a polypropylene/calcium carbonate compound comprising at least 50%, but not more than 66% calcium carbonate by weight. In an embodiment, the adhesive 25 is made from a polypropylene/calcium carbonate compound comprising approximately 60% calcium carbonate by weight. The adhesive 25 made from a polypropylene/calcium carbonate compound comprising at least 50% calcium carbonate by weight, is expected to have higher thermal conductivity than an adhesive made from polypropylene alone, or than an adhesive made from a polypropylene/calcium carbonate compound comprising less than 50% calcium carbonate by weight. Because of the higher thermal conductivity using an adhesive 25 made from a compound of polypropylene and calcium carbonate comprising at least 50% calcium carbonate by weight, it is anticipated that it will set faster, and thus, apparatus 900 will operate at higher overall throughput than it would when using an adhesive 25 comprising more than 50% polypropylene.

In an embodiment, the backing of composite cover 817 comprises polypropylene, and the backing comprising polypropylene is in a layer having a thickness of between 10 mil and 40 mil. In an embodiment, the backing layer of the composite cover material 817 is approximately 10 mil, 15 mil, 20 mil or 25 mil thick. In an embodiment, the backing of the composite cover material 817 is another suitable thickness.

In an embodiment, the backing of the composite cover material 817 is formed from a polypropylene/calcium carbonate compound comprising at least 50%, but not more than 66% calcium carbonate by weight. In an embodiment, the backing of the composite cover material 817 is formed from a polypropylene/calcium carbonate compound comprising approximately 60% calcium carbonate by weight. The backing of the composite cover material 817 formed from a polypropylene/calcium carbonate compound comprising at least 50% calcium carbonate by weight, is expected to have higher thermal conductivity than a backing made from polypropylene alone, or than a backing made from a polypropylene/calcium carbonate compound comprising less than 50% calcium carbonate by weight. Because of the higher thermal conductivity using a composite cover material 817 having a backing formed from a compound of polypropylene and calcium carbonate comprising at least 50% calcium carbonate by weight, it is anticipated that the adhesive 25 will set faster, and thus, apparatus 900 will operate at higher overall throughput than it would when using a composite cover material 817 having a backing formed from a compound of polypropylene and calcium carbonate comprising more than 50% polypropylene.

The following tables presents illustrative paint rollers that will be used in the discussion below.

|  | Cover | Adhesive | Strip |
| --- | --- | --- | --- |
| Example A1 | 0/0% | 10/0% | 20/0% |
| Example A2 | 10/0% | 10/0% | 20/0% |

The following table presents illustrative paint rollers that can be formed using the invention disclosed herein. The "Cover" column refers to the cover material 817 used, the "Adhesive" column refers to the adhesive 25 used and the "Strip" column refers to the strip 23 used in the example. For each column, the entry reflects the thickness in mil, and the percentage of calcium carbonate (by weight) compounded with polypropylene to form the component. The thickness in mil for the "Cover" column reflects the thickness of the layer 25 used to form the composite cover material 817—the "Cover" column entries showing a thickness of 0 reflect the use of a cover material rather than a composite cover material.

|            | Cover  | Adhesive | Strip  |
|------------|--------|----------|--------|
| Example B1 | 0/0%   | 10/60%   | 20/60% |
| Example B2 | 10/0%  | 10/60%   | 20/60% |
| Example B3 | 10/25% | 10/60%   | 20/60% |

Example A1 and B1, each make paint rollers of the same thickness, however, the characteristics of the paint roller B1 are substantially improved when compared to those of A1. The B1 paint roller feels firmer and is of higher quality than the A1 paint roller. Moreover, the mil thick B1 paint roller uses only 40% of the polypropylene used to manufacture the A1 paint roller (excluding any polypropylene in the cover material).

Similarly, Example A2 and B2, each make paint rollers of the same thickness, however, the characteristics of the paint roller B2 are substantially improved when compared to those of A2. The B2 paint roller feels firmer and is of higher quality than the A2 paint roller. Moreover, the 40 mil thick B2 paint roller uses only 55% of the polypropylene used to make the A2 paint roller (excluding any polypropylene in the cover material). In fact, the B1 paint roller compares favorably to the A2 paint roller while using only as much as 30% as much polypropylene.

Notably the B3 paint roller is the most superior of all of these example rollers, and it uses less than half as much polypropylene as the A2 roller, and just over half as much as the A1 roller.

Many other variations are possible. For example, it is not necessary to use both a compound adhesive and a strip formed from compounding polypropylene and calcium carbonate. In addition, it is not necessary to use a composite cover material formed from a compound of polypropylene/calcium carbonate. The use of (i) a compound strip, (ii) compound adhesive or (ii) composite cover material formed from a compound of polypropylene/calcium carbonate, will each produce a stronger roller, with less polypropylene, than the use of same component made from non-compound polypropylene.

Returning now to FIG. 14, in an embodiment, strips 23, 423 comprise polypropylene, and each have a thickness of between 10 mil and 40 mil. In an embodiment, strips 23, 423 are each approximately 10 mil, 15 mil, 20 mil or 25 mil thick. In an embodiment, strips 23, 423 may be of another suitable thickness. It is not necessary that each of the strips 23, 423 are the same thickness.

In an embodiment, at least one strip 23, 423 is made from a polypropylene/calcium carbonate compound comprising at least 50%, but not more than 66% calcium carbonate by weight. In an embodiment, at least one strip 23, 423 is made from a polypropylene/calcium carbonate compound comprising approximately 60% calcium carbonate by weight. A strip 23, 423 made from a polypropylene/calcium carbonate compound comprising at least 50% calcium carbonate by weight, is expected to have higher thermal conductivity than a strip made from polypropylene alone, or than a strip made from a polypropylene/calcium carbonate compound comprising less than 50% calcium carbonate by weight. Because of the higher thermal conductivity using at least one strip 23, 423 made from a compound of polypropylene and calcium carbonate comprising at least 50% calcium carbonate by weight, it is anticipated that the adhesive 425 will set faster, and thus, apparatus 410 will operate at higher overall throughput than it would when using strips 23, 423 comprising more than 50% polypropylene.

In an embodiment, adhesive 425 comprises polypropylene, and is applied in a layer having a thickness of between 10 mil and 40 mil. In an embodiment, the layer of adhesive 425 is approximately 10 mil, 15 mil, 20 mil or 25 mil thick. In an embodiment, the layer of adhesive 425 is another suitable thickness.

In an embodiment, the adhesive 425 is made from a polypropylene/calcium carbonate compound comprising at least 50%, but not more than 66% calcium carbonate by weight. In an embodiment, the adhesive 425 is made from a polypropylene/calcium carbonate compound comprising approximately 60% calcium carbonate by weight. The adhesive 425 made from a polypropylene/calcium carbonate compound comprising at least 50% calcium carbonate by weight, is expected to have higher thermal conductivity than an adhesive made from polypropylene alone, or than an adhesive made from a polypropylene/calcium carbonate compound comprising less than 50% calcium carbonate by weight. Because of the higher thermal conductivity using an adhesive 425 made from a compound of polypropylene and calcium carbonate comprising at least 50% calcium carbonate by weight, it is anticipated that it will set faster, and thus, apparatus 410 will operate at higher overall throughput than it would when using an adhesive 425 comprising more than 50% polypropylene.

In an embodiment, the backing of cover 817 comprises polypropylene, and the backing comprising polypropylene is in a layer having a thickness of between 10 mil and 40 mil. In an embodiment, the backing layer of the composite cover material 817 is approximately 10 mil, 15 mil, 20 mil or 25 mil thick. In an embodiment, the backing of the composite cover material 817 is another suitable thickness.

In an embodiment, the backing of the composite cover material 817 is formed from a polypropylene/calcium carbonate compound comprising at least 50%, but not more than 66% calcium carbonate by weight. In an embodiment, the backing of the composite cover material 817 is formed from a polypropylene/calcium carbonate compound comprising approximately 60% calcium carbonate by weight. The backing of the composite cover material 817 formed from a polypropylene/calcium carbonate compound comprising at least 50% calcium carbonate by weight, is expected to have higher thermal conductivity than a backing made from polypropylene alone, or than a backing made from a polypropylene/calcium carbonate compound comprising less than 50% calcium carbonate by weight. Because of the higher thermal conductivity using a composite cover material 817 having a backing formed from a compound of polypropylene and calcium carbonate comprising at least 50% calcium carbonate by weight, it is anticipated that the adhesive 425 will set faster, and thus, apparatus 410 will operate at higher overall throughput than it would when using a composite cover material 817 having a backing formed from a compound of polypropylene and calcium carbonate comprising more than 50% polypropylene.

The following table presents illustrative paint rollers that will be used in the discussion below.

|            | Cover  | Adhesive | Strip 1 | Strip 2 |
|------------|--------|----------|---------|---------|
| Example C1 | 0/0%   | 10/0%    | 10/0%   | 10/0%   |
| Example C2 | 10/0%  | 10/0%    | 10/0%   | 10/0%   |
| Example C3 | 10/0%  | 10/0%    | 20/0%   | 20/0%   |
| Example C4 | 0/0%   | 10/0%    | 20/0%   | 20/0%   |

The following table presents illustrative paint rollers that can be formed using the invention disclosed herein. The "Cover" column refers to the cover material 817 used, the "Adhesive" column refers to the adhesive 425 used, the "Strip 1" column refers to the strip 23 used and the "Strip 2" column refers to the strip 423 used in the example. As above, for each column, the entry reflects the thickness in mil, and the percentage of calcium carbonate (by weight) compounded with polypropylene to form the component. The thickness in mil for the "Cover" column reflects the thickness of the layer 425 used to form the composite cover material 817—the "Cover" column entries showing a thickness of 0 reflect the use of a cover material rather than a composite cover material.

|            | Cover  | Adhesive | Strip 1 | Strip 2 |
|------------|--------|----------|---------|---------|
| Example D1 | 0/0%   | 10/56%   | 10/60%  | 10/60%  |
| Example D2 | 10/0%  | 10/56%   | 10/60%  | 10/60%  |
| Example D3 | 10/25% | 10/56%   | 10/60%  | 10/60%  |
| Example D4 | 10/25% | 10/56%   | 20/60%  | 20/60%  |

Example C1 and D1, each make paint rollers of the same thickness, however, the characteristics of the paint roller D1 are substantially improved when compared to those of C1. The D1 paint roller feels firmer and is of higher quality than the C1 paint roller. Moreover, the 40 mil thick core of the D1 paint roller uses only 42% of the polypropylene used to manufacture the C1 paint roller (excluding any polypropylene in the cover material).

Example D2 forms a paint roller with very good properties and firmness. This roller compares favorably to Example D1 due to its extra 10 mil thickness. Moreover, Example D2 compare favorably not only to Example C1, but to Example C2 having a core of the same thickness (50 mil), and even to Example C3, despite Example C3 having a core of 70 mil and using substantially more than twice as much polypropylene. Example D3 makes an even better paint roller, while Example D4 makes an excellent quality paint roller. Notably, while Example D4 is the same core thickness as example C3, it uses only about 46% as much polypropylene.

As above, many other variations are possible. For example, it is not necessary to use both a compound adhesive and a strip formed from compounding polypropylene and calcium carbonate. Moreover, it is not necessary to form both strips from a compound adhesive. In addition, it is not necessary to use a composite cover material formed from a compound of polypropylene/calcium carbonate. The use of (i) a compound strip, (ii) compound adhesive or (ii) composite cover material formed from a compound of polypropylene/calcium carbonate, will each produce a stronger roller, with less polypropylene, than the use of same component made from non-compound polypropylene.

Further, it has been observed that the two-strip 60 mil core roller of Example C4 provides approximately the same qualities as the single strip, 40 mil core roller of Example A2, while the latter roller uses only about 37% as much polypropylene. Also, notably, the two-strip 50 mil core Example D2 provides a much stronger roller than the two-strip 60 mil core roller made according to Example C4.

Returning to FIG. 15, in an embodiment, one or both of the strips 445, 448 can be made from a compound of polypropylene and calcium carbonate having at least 50%, but not more than about 66% calcium carbonate by weight. Similarly, in an embodiment the cover 415 may having a backing made of a compound of polypropylene and calcium carbonate having at least 50% but not more than 66% calcium carbonate by weight. As discussed above, the percentage of calcium carbonate used in the compound forming the strips 448, 445 and the cover 415 backing may be the same, or may differ from one-another.

In an embodiment, the strips 445, 448 are made from a compound of polypropylene and calcium carbonate having approximately 60% calcium carbonate, and the cover 415 has a backing made of a compound of 105 MFI polypropylene and non-refined calcium carbonate having approximately 25% calcium carbonate by weight.

Returning to FIG. 16, apparatus 500 may be operated according to the present invention using a preformed core 540 made of a compound of polypropylene and calcium carbonate having at least 50%, but not more than 66% calcium carbonate by weight; and/or using a cover 520 having a backing made of a compound of polypropylene and calcium carbonate having between 5% and 66% calcium carbonate by weight. When more than one component is made of a compound of polypropylene and calcium carbonate, the percentage of calcium carbonate used in the compound forming the core 540 and the cover 520 backing may be the same, or may differ from one-another. In an embodiment, the core 540 is made of a compound of polypropylene and calcium carbonate comprising approximately 60% calcium carbonate by weight, and the cover backing is made of a compound of polypropylene and calcium carbonate comprising approximately 25% calcium carbonate by weight.

As discussed above variation in the amount of calcium carbonate are within the scope of the invention, and thus, it will be apparent to one of skill in the art that to some degree thermal conductivity can be controlled, or a desired thermal conductivity or range of thermal conductivity can be achieved by varying the percentage of calcium carbonate in one or more of the compounds. It will be apparent to one of skill in the art that to some degree, stiffness can be controlled, or a desired stiffness or range of stiffness can be achieved by varying the percentage of calcium carbonate in these compounds as well.

It is possible, without departing from the invention, to use a compound of polypropylene and calcium carbonate having between 50% and 60% calcium carbonate by weight in lieu of polypropylene in making paint rollers. In light of this disclosure, other methods for the manufacture of the same will be apparent to persons of skill in the art.

Benefits of certain embodiments of the instant invention include: control of thermal conductivity in the component materials leading to faster throughput and/or faster set times; and control of material characteristics such as stiffness for manufacture of harder, more expensive paint rollers.

Observations Made Since Filing U.S. Patent Application Ser. No. 12/463,876

Figure 17:
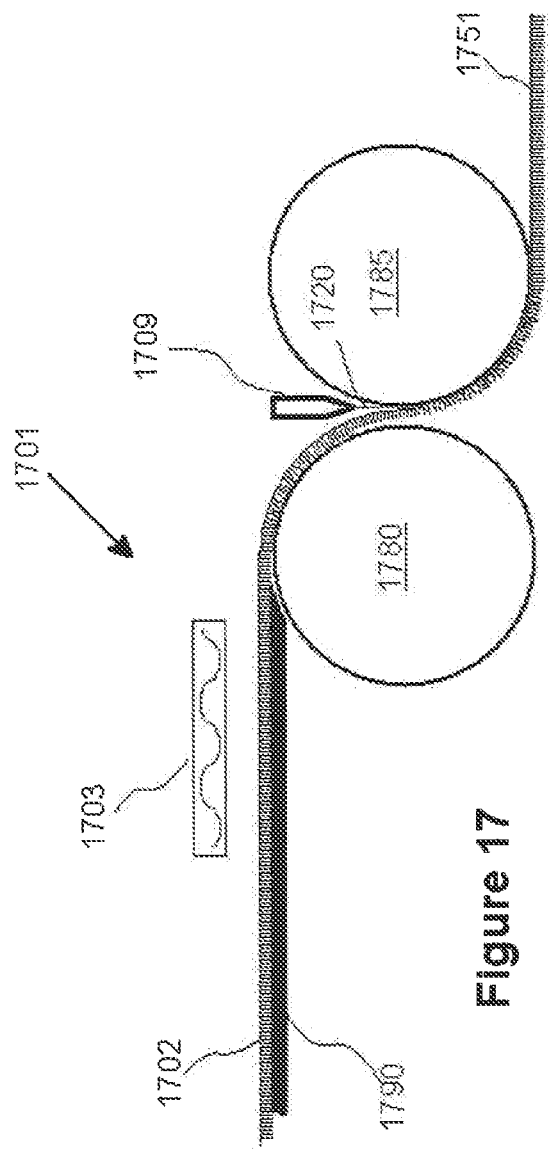
FIG. 17 is a side-view diagrammatic representation of a further apparatus for making composite cover material in accordance with an embodiment of the present invention.

Turning to FIG. 17, a functional drawing of the apparatus 1701 for forming the composite paint roller cover 1751 having a backing is shown. The composite cover material 1751 is formed using a supply of pile material 1702 such as would be suitable for use manufacturing a paint roller cover. The composite cover material is formed using a continuous supply of such pile material. Suitable pile material 1702 includes material like that manufactured using a sliver knitting machine such as the SK-18 available from Mayer Industries Inc. Such knitted pile material may be made "in the round," and slit for use as a continuous pile material. Once slit, the knitted pile material can be laid flat for further processing. As an alternative to the knitted pile material, a woven pile material may be used. Such a woven pile material, while generally more expensive than the knitted material, is advantageous as its fibers are better locked in during the weaving process rather than by later application of an adhesive. The knitted or woven pile material 1702 is usually sheared (not shown) on the pile side to attain a desired pile height. As an alternative to woven or knitted materials, a microfiber material may be used. The material 1702 can have any usable width, such as widths of approximately 32" or, for example between about 56" and 62", and can be manufactured or sheared to a desired pile height. In an embodiment, the material has a pile side (shown facing downwards and towards the left) and a fabric side (shown facing upwards and toward the right).

In an embodiment, the material 1702 is laid flat with its pile side down and may be moved across a tenter, a/k/a, a tenter frame. Other apparatus may be used to advance the material 1702. In an embodiment, the material 1702 is moved in a generally horizontal direction along surface 1790 with the pile side down towards roller 1780. The material 1702 is then advanced, along with an adhesive layer 1720, toward a nip between roller 1780 and counter-rotating roller 1785, where the adhesive layer 1720 and the material 1702 are urged together. Thereafter the thus joined components 1751 are transferred to counter-rotating roller 1785, and begin to cool. The joined components, or composite sheet material 1751 is thereafter taken off the counter-rotating roller 1785 and advanced in a generally horizontal direction. The composite sheet material may then be transferred to a slitter (not shown) or slit in-line (not shown), into strips of composite cover material suitable for use in manufacturing paint rollers. In an embodiment, the material 1702 is advanced at a line speed of at least 5 yards per minute, and more preferably more than 10 yards per minute. In an embodiment, the apparatus 1701 is operated at a speed to between 12 and 20 yards per minute.

In an embodiment, a heat source 1703 is directed towards the fabric side of the material 1702 as it advances. When a heat source 1703 is used the heat source should be able to apply heat to the fabric side of the material and raise the temperature thereof. Any kind of heat source 1703 may be used. In an embodiment, the heat source 1703 may be an infrared heat source. In an embodiment, the heat source 1703 may be a resistive heat element. In an embodiment, the heat source 1703 causes that surface temperature on the fabric side of the material 1702 to reach at least about 50 degrees C., or more preferably about 55 degrees C., prior to reaching or making contact with roller 1780. In an embodiment, the heat source 1703 causes that surface temperature on the fabric side of the material 1702 to reach at least about 50 degrees C., but not more than 65 degrees C., prior to reaching or making contact with roller 1780. In an embodiment, the heat source 1703 causes that surface temperature on the fabric side of the material 1702 to reach at least 50 degrees C., but not more than 95 degrees C., prior to reaching or making contact with roller 1780. In an embodiment, the heat source 1703 causes that surface temperature on the fabric side of the material 1702 to reach approximately the same temperature as the roller 1780, prior to making contact with roller 1780.

The roller 1780 may be of any suitable diameter, and have a width sufficient to support the advancing material 1702. In an embodiment, the roller 1780 has a diameter of more than about 6", preferably more than about 12", and more preferably about 24" or around 65 cm. In an embodiment, during use roller 1780 is maintained at a temperature that deviates from the ambient temperature. In an embodiment, roller 1780 is maintained at a temperature that is elevated above ambient temperature by at least 15 degrees C., and preferably more than about 25 degrees C., and more preferably between about 40 and 70 degrees C. above the ambient temperature. In an typical paint roller manufacturing environment, ambient temperature is typically between about 20 degrees C. and 30 degrees C., and frequently around 25 degrees C. In an embodiment, roller 1780 is maintained at a temperature of more than 60 degrees C., but not more than 100 degrees C., and preferably between about 65 degrees C. and 95 degrees C.

The material 1702 is advanced along roller 1780, pile side down, for a portion of a rotation. In an embodiment where the roller 1780 is maintained at a temperature that deviates from ambient temperature, the temperature of the material 1702 may change in the direction of the deviation as the material 1702 advances along the roller 1780. In an embodiment, the material 1702 is advance along roller 1780 for between about ⅕ and ¼ of a revolution. In an embodiment, the roller 1780 is heated above ambient temperature, and the material 1702 is advance along roller 1780 for between about ⅕ and ¼ of a revolution, increasing the temperature of the material 1702 above ambient temperature. In an embodiment, the roller 1780 is heated to at least about 50 degrees C. to heat the material 1702 above ambient temperature as it advances along roller 1780. In an embodiment, the roller 1780 is heated to at least about 60 degrees C. but not more than 100 degrees C. to heat the material 1702 above ambient temperature as it advances along roller 1780. In an embodiment, the roller 1780 is heated to between 65 degrees C. and 95 degrees C.

An applicator 1709 dispenses an adhesive layer 1720 between the fabric side of material 1702 that has advanced along roller 1780 and a second roller 1785. In an embodiment, the applicator 1709 is an extrusion die head, and the adhesive layer 1720 is dispensed in a smoothly flowing layer as extrudate from an extrusion process. In an embodiment, the adhesive layer 1720 is dispensed in a generally vertical direction and gravity carries the extrudate downward from the applicator 1709. As the material 1702 advances in the apparatus 1701, the adhesive layer 1720 is sandwiched between the fabric side of the material 1702 and a second roller 1785. In an embodiment, the adhesive layer 1720 is extruded from the applicator 1709, and is sandwiched between the fabric side of the material 1702 and a second roller 1785 while the it is still in a molten, or at least partially liquefied state. In an embodiment, after its application to the fabric backing of the material 1702, the un-set adhesive layer 1720 fills interstitial spaces or gaps within the fabric backing of the material 1702 before setting, thus integrating the adhesive layer 1720 with the material 1702, and forming a composite sheet material 1751. In an embodiment, the adhesive layer 1720 is permitted to cool and set once integrated with the fabric backing of the material 1702. The thusly formed composite sheet material 1715 is thicker, and may be stiffer than the material 1702 absent the integrated materials from the adhesive layer 1720. In an embodiment, the fibers of the of the composite sheet material 1751 are better held in place, and thus less likely to shed, by the integration of the adhesive layer 1720 with the material 1702. In an embodiment, substantially all of the fibers of the of the composite sheet material 1751 are locked in place by the integration of the adhesive layer 1720 with the material 1702, and thus, the composite sheet material can be use, once cut into strips as discussed above, to make substantially shed-free paint roller covers.

In an embodiment, the material 1702 may be advanced in a generally linear manner, not curving substantially around the rollers 1780, 1785. In such embodiment, the material 1702 would pass, pile-side-down, above the first roller 1780, and fabric-side-up beneath the second roller 1785. In such embodiment, applicator 1709 may dispense the adhesive layer 1720 onto the fabric-side of the material 1702, onto the face of the roller 1785, or, to both the fabric-side of the material 1702 and the face of the roller 1785 substantially simultaneously.

In an embodiment, the material 1702 and the adhesive layer 1720 are advanced along roller 1785, pile side out and sandwiched adhesive layer in, for a fraction of a revolution. In an embodiment, roller 1785 rotates in a direction counter to the direction of rotation of roller 1780. In an embodiment, the material 1702 and the adhesive layer 1720 are advanced along the roller 1785 for approximately ⅕ to ¼ of a revolution. In an embodiment, the material 1702 and the adhesive layer 1720 are advanced along the roller 1785 until they are returned to a generally horizontal direction along apparatus 1701. In an embodiment, as the assembly separates from the roller 1785, the adhesive layer 1720 has substantially hardened and set, and is integrated into the material 1702, thus forming a composite sheet material 1751. The composite sheet material 1751 may be advanced, slit to form composite cover strips and the strips used in the fabrication of paint rollers (not shown in FIG. 17).

The roller 1785 may be of any suitable diameter, and have a width sufficient to support the advancing material 1702. In an embodiment, the roller 1785 has a diameter substantially the same as the diameter of roller 1780. In an embodiment, the roller 1785 has a width substantially the same as the width of roller 1780. In an embodiment, during use roller 1785 is maintained at a temperature that deviates from the ambient temperature. In an embodiment, roller 1785 is maintained at a temperature that is below the ambient temperature by at least 5 degrees C., and is preferably maintained at a temperature of between 5 and 15 degrees C. In an embodiment, roller 1785 maintained at a temperature of more than about 10 degrees C. In an embodiment, roller 1785 maintained at a temperature of less than about 13 degrees C.

In an embodiment, roller 1785 is maintained at a temperature of between approximately 50 degrees C. and 100 degrees C. colder than roller 1780.

In an embodiment where the roller 1785 is maintained at a temperature that deviates from ambient temperature, the temperature of the adhesive layer 1720 and the fabric backing of material 1702 may change in the direction of the deviation as the components advance along the roller 1785. In an embodiment, the material 1702 is advance along roller 1785 for between about ⅕ and ¼ of a revolution. In an embodiment, the roller 1780 is cooled below ambient temperature, and the components forming the composite sheet material 1751 are advance along roller 1785 for between about ⅕ and ¼ of a revolution, decreasing the temperature of the adhesive layer 1720 and the material 1702, and causing the adhesive layer 1720 to more rapidly harden and set. In an embodiment, the roller 1785 is chilled to at least about 15 degrees C. In an embodiment, the roller 1785 is chilled to a temperature between 10 degrees C. and 15 degrees C.

Although shown relatively far apart in FIG. 17 for illustrative purposes, the rollers 1780, 1785 may be close together. A nominal gap of about five 1000ths of an inch (0.005") is provided between the rollers 1780, 1785 to ensure that the rollers will not contact each other, as such contact may cause damage to the rollers and/or entire apparatus 1701. In an embodiment, the distance between the rollers 1780, 1785 is adjustable to permit variations in type of material 1702, the pile size of the material 1702 and the desired thickness of the adhesive layer 1720, which is discussed further, below. In an embodiment, an adjustment allows for management of the pressure applied between the rollers 1780, 1785 as the adhesive layer 1720 and the material 1702 pass there-between. In an embodiment, the adhesive layer 1720 is sandwiched between the fabric side of the material 1702 as it passes through the restricted space between the rollers 1780, 1785, thus urging the adhesive layer 1720 into the interstitial pores in the fabric side of the material 1702. It is believed by the inventor that the gathering of the components (the adhesive layer 1720 and the material 1720) between the rollers 1780, 1785 in the manner shown and described may cause the portion of the adhesive layer 1720 that first comes in contact with the roller 1785 to begin to set while the portion of the adhesive layer 1720 that first comes in contact with the material 1702 is still substantially in a molten or partially liquefied state and able to integrating into the fabric backing of the material 1702.

In an embodiment, the nip force, that is, a compressive force imparted on the components (i.e., the material 1702 and adhesive layer 1720) as they pass between the rollers 1780, 1785 is at least 80 lbs. per linear inch (PLI), and more preferably between 100 and 200 PLI, and most preferably between about 150 and 175 PLI. In an embodiment, the nip force is adjustable, and controlled by a pneumatic system (not shown) wherein air pressure delivered to a piston will increase the nip force. In an embodiment, the nip force can be adjusted to accommodate differing pile thickness of the material 1702 and differing thickness of the adhesive layer 1720. In an embodiment, about 80 PSI air pressure into a pneumatic system will create approximately 150 PLI in nip pressure.

In an embodiment, the adhesive layer 1720 is has a thickness of between about 0.005" (5 mils) and 0.025" (25 mils). In an embodiment, the adhesive layer 1720 is as thin as practical to provide a composite sheet material 1751 having a generally uniform backing. In an embodiment the adhesive layer 1720 provides a composite sheet material 1751 having a generally non-porous backing. In an embodiment, the resulting composite sheet material 1751 has a non-pile backing of less than about 20 mils. In an embodiment, composite sheet material 1751 has a non-pile backing of less than about 15 mils. In an embodiment, composite sheet material 1751 has a non-pile backing of less than about 10 mils, or less than about 5 mils.

In an embodiment, the adhesive layer 1720 extruded from the applicator 1709 is made at least partially from an thermoplastic elastomer, and preferably from a polypropylene-based elastomer such as the propylene-based elastomer available from ExxonMobile under the brand name Vistamaxx. Polypropylene-based elastomers also include Sarlink 3170 from DSM Thermoplastic Elastomers Inc. (of Leominster, Mass.), and several Dow Chemical Company specialty elastomers for thermoplastic polyolefins.

In an embodiment, the propylene-based elastomer has density of between 0.5 and 1 g/cm$^3$, and preferably between about 0.75 and 0.9 g/cm$^3$. In an embodiment, the propylene-based elastomer has a melt index of greater than 1, and preferably at least 3. In an embodiment, the propylene-based elastomer has a melt index of 5 or more. It is believed that as the relative percentage by weight of propylene-based elastomer increases in the backing compound, the melt flow would preferably be higher. In an embodiment, the propylene-based elastomer comprises an ethylene content of at least 5 wt. %, and preferably at least 10 wt. %. In an embodiment, the propylene-based elastomer comprises an ethylene content of at least 15 wt. %.

In an embodiment, the adhesive layer 1720 is made at least partially from the polypropylene-based elastomer Vistamaxx 6202. In an embodiment, the adhesive layer 1720 is made predominantly from the polypropylene-based elastomer Vistamaxx 6202. Vistamaxx 6202 is reported by ExxonMobile to have a density (ASTM D1505) of 0.861 g/cm$^3$, a melt index (ASTM 1238) of 7.4 g/10 min. and a melt mass-flow rate melt index (ASTM 1238) of 18 g/10 min. Vistamaxx 6202 is reported by ExxonMobile to have an ethylene content (ASTM D3900) of 15.0 wt. %.

In an embodiment, the adhesive layer 1720 comprises a polypropylene-based elastomer and calcium carbonate. In an embodiment, the adhesive layer 1720 is a compound comprising a polypropylene-based elastomer such as Vistamaxx 6202 and at least about 15 wt. %, but not more than 66 wt. %, calcium carbonate. In an embodiment, the adhesive layer 1720 is a compound comprising a polypropylene-based elastomer such as Vistamaxx 6202 and between about 20 and 50 wt. % calcium carbonate. In an embodiment, the adhesive layer 1720 is a compound comprising a polypropylene-based elastomer such as Vistamaxx 6202 and between about 25 and 33 wt. % calcium carbonate.

In an embodiment, the adhesive layer 1720 further comprises polypropylene, thus making it a compound comprising a polypropylene-based elastomer, calcium carbonate and polypropylene. Thus, in an embodiment, the adhesive layer 1720 is a compound comprising a polypropylene-based elastomer such as Vistamaxx 6202 and between about 15 and 50 wt. % calcium carbonate and between about 5 and 30 wt. % polypropylene.

More generally, the above-describe inventive adhesive material comprising an polypropylene-based elastomer may be used in connection with the apparatus described in FIGS. 1-11, 13 and 16.

EXAMPLE 1

An adhesive layer was formed by compounding 85 wt. % Vistamaxx 6202 and 15 wt. % calcium carbonate. Composite sheet material was made by passing a material over a first heated roller, and as the material received an adhesive layer, under a second cooled roller, substantially in the layout shown in FIG. 17. The composite sheet material was tested for its ability to lock fibers and in other subjective and objective ways, and the results were deemed acceptable for use as a composite cover material once slit into strips.

EXAMPLE 2

An adhesive layer was formed by compounding 80 wt. % Vistamaxx 6202, wt. % calcium carbonate and 5 wt. % 4920WZ-US polypropylene resin. Composite sheet material was made otherwise as in Example 1 above. The composite sheet material was tested for its ability to lock fibers and in other subjective and objective ways, and the results were deemed acceptable, and better than the results for Example 1, for use as a composite cover material once slit into strips.

EXAMPLE 3

An adhesive layer was formed by compounding 55 wt. % Vistamaxx 6202, wt. % calcium carbonate and 15 wt. % 4920WZ-US polypropylene resin. Composite sheet material was made otherwise as in Example 1 above. The composite sheet material was tested for its ability to lock fibers and in other subjective and objective ways, and the results were deemed very good, and substantially better than the results for Example 1 or 2, for use as a composite cover material once slit into strips.

The adhesive layer 1720 preferably comprises 25 wt. % to about 85 wt. % polypropylene-based elastomer, about 15 wt. % to about 50 wt. % calcium carbonate and 0 wt. % to about 50 wt. % polypropylene. In an embodiment, the adhesive layer 1720 comprises about 15 wt. % to about 50 wt. % calcium carbonate, 0 wt. % to about 50 wt. % polypropylene, and the balance being a polypropylene-based elastomer.

Melt Flow: It has been discovered that the compounding of calcium carbonate with polypropylene—while not predictably affecting the resulting compound's melt flow—will affects the material's extrudability, that is, the ability of the material to be extruded in a smoothly flowing layer such as the adhesive layer 1720 that may be used to form the composite sheet material 1751, and composite strip material, discussed above. Accordingly, where substantial amounts of calcium carbonate are part of the extrudate, to achieve a smoothly flowing layer of adhesive, it has been found that the polypropylene should have an elevated melt flow from what would otherwise be used.

Surface Treatment: In further experiments, in almost all cases, the use of refined calcium carbonate in combination with polypropylene, e.g., calcium carbonate that has been surface treated, has been found to add strength to the resulting paint roller product when compared to a combination of non-refined calcium carbonate in combination with polypropylene. Thus, in an embodiment, the calcium carbonate compounded with polypropylene to form the adhesives, strips or composite cover material, may be a non-refined or refined calcium carbonate, but is preferably a refined calcium carbonate. In an embodiment, the refined calcium carbonate is used in a relatively fine, powdered form. In an embodiment the calcium carbonate may have a median particle size of 3 micrometers or less.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention, and has disclosed the ways the inventor now believes are the best ways to practice the invention. The above description and drawings are merely illustrative of the present invention and that changes in components, structure and procedure are possible without departing from the scope of the present invention as defined in the following claims. Thus, while the invention has been particularly shown and described with reference to embodiments thereof, it will be understood by those skilled in the art that various changes in form and details may be made therein without departing from the spirit and scope of the invention. The above embodiments are illustrative of the present invention. It is neither necessary, nor intended for this patent to outline or define every possible combination or embodiment.

What is claimed is:

1. A method of making a paint roller comprising the steps of:
    helically winding a strip of material around a mandrel so as to form a helically wound strip;
    advancing the wound strip along the mandrel;
    extruding a polypropylene-based compound to form a smoothly flowing layer of adhesive, the polypropylene-based compound comprising
        (i) at least 5% but not more than 66% calcium carbonate by weight; and
        (ii) a polypropylene resin;
    applying the layer of adhesive onto an outer surface of the wound strip;
    helically wrapping a strip of composite cover material about the wound strip and over the layer of adhesive, the composite cover material having a backing with a thickness of about 10 to 40 mils and comprising
        (i) at least 25% but not more than 50% calcium carbonate by weight; and
        (ii) polypropylene-based elastomer;
    allowing the adhesive to cool, thereby bonding the strip of cover material to the wound strip.

2. The method of claim 1, wherein the composite cover material backing further comprises up to 50% polypropylene resin by weight.

3. The method of claim 2, wherein the composite cover material backing comprises:
(i) at least 10% but not more than 40% calcium carbonate by weight;
(ii) at least 40% but not more than 85% polypropylene-based elastomer by weight; and
(iii) polypropylene resin.

4. A method for continuously producing a multi-strip laminate paint roller comprising the steps of:
helically advancing an inner strip of thermoplastic material around a mandrel so as to form a helically wound inner strip, the inner strip having an inner surface and an outer surface;
helically winding a second strip of thermoplastic material around a mandrel in offset relation to the inner strip, so as to form a helically wound second strip, the second strip having an inner surface and an outer surface;
advancing the wound inner and second strips along the mandrel;
extruding a polypropylene-based compound to form a smoothly flowing layer of adhesive, the polypropylene-based compound comprising
(i) at least 5% but not more than 66% calcium carbonate by weight; and
(ii) polypropylene resin;
applying the layer of adhesive onto at least a portion of the outer surface of the wound inner strip and at least a portion of the outer surface of the wound second strip;
wrapping a strip of composite cover material about the wound second strip and over the layer of adhesive applied to at least a portion of the outer surface, the composite cover material having an inner surface and an outer surface, the outer surface of the composite cover material comprising a pile fabric, and the inner surface of the composite cover material having a backing with a thickness of about 10 to 40 mils and comprising at least 25% but not more than 50% calcium carbonate by weight and a polypropylene-based elastomer;
applying a compressive force from without the composite cover material to urge the composite cover material, the layer of adhesive, and the inner and second strips together, thereby laminating the inner surface of the composite cover material to the outer surface of the second strip and laminating the inner surface of the second strip to the outer surface of the inner strip; and
allowing the adhesive to set, thereby creating the multi-strip laminated paint roller.

5. The method of claim 4, wherein the composite cover material backing further comprises up to 50% polypropylene resin by weight.

6. The method of claim 5, wherein the composite cover material backing comprises:
(i) at least 10% but not more than 40% calcium carbonate by weight;
(ii) at least 40% but not more than 85% polypropylene-based elastomer by weight; and
(iii) a polypropylene resin.

7. A method for continuously making a laminated paint roller comprising the steps of:
helically winding a strip of thermoplastic material around a mandrel so as to form a helically wound strip, the strip having an inner surface and an outer surface;
advancing the helically wound strip along the mandrel;
extruding a polypropylene-based compound to form a smoothly flowing layer of adhesive, the polypropylene-based compound comprising
(i) at least 5% but not more than 66% calcium carbonate by weight; and
(ii) polypropylene resin;
applying the layer of adhesive onto at least a portion of the outer surface of the wound strip;
wrapping a strip of composite cover material about the wound strip and over the layer of adhesive applied to at least a portion of the outer surface of the wound strip, the composite cover material having an inner surface and an outer surface, the outer surface of the composite cover material comprising a pile fabric, and the inner surface of the composite cover material having a backing with a thickness of about 10 to 40 mils and comprising at least 25% but not more than 50% calcium carbonate by weight and a polypropylene-based elastomer;
applying a compressive force from without the composite cover material to urge the composite cover material, the layer of adhesive, and the strip together, thereby laminating the inner surface of the composite cover material to the outer surface of the strip; and
allowing the adhesive to set, thereby creating the laminated paint roller.

8. The method of claim 7, wherein the composite cover material backing further comprises up to 50% polypropylene resin by weight.

9. The method of claim 8, wherein the composite cover material backing comprises:
(i) at least 10% but not more than 40% calcium carbonate by weight;
(ii) at least 40% but not more than 85% polypropylene-based elastomer by weight; and
(iii) polypropylene resin.

10. A method of making a paint roller comprising the steps of:
helically winding a strip of material around a mandrel so as to form a helically wound strip;
advancing the wound strip along the mandrel;
extruding a thermoplastic compound to form a smoothly flowing layer of adhesive;
applying the layer of adhesive onto an outer surface of the wound strip;
helically wrapping a strip of composite cover material about the wound strip and over the layer of adhesive, the composite cover material having a backing with a thickness of about 10 to 40 mils and comprising
(i) at least 25% but not more than 50% calcium carbonate by weight; and
(ii) polypropylene-based elastomer;
allowing the adhesive to cool, thereby bonding the strip of cover material to the wound strip.

11. The method of claim 10, wherein the composite cover material backing further comprises up to 50% polypropylene resin by weight.

12. The method of claim 11, wherein the composite cover material backing comprises:
(i) at least 10% but not more than 40% calcium carbonate by weight;
(ii) at least 40% but not more than 85% polypropylene-based elastomer by weight; and
(iii) a polypropylene resin.

13. A method for continuously producing a multi-strip laminate paint roller comprising the steps of:

helically advancing an inner strip of thermoplastic material around a mandrel so as to form a helically wound inner strip, the inner strip having an inner surface and an outer surface;

helically winding a second strip of thermoplastic material around a mandrel in offset relation to the inner strip, so as to form a helically wound second strip, the second strip having an inner surface and an outer surface;

advancing the wound inner and second strips along the mandrel;

extruding a thermoplastic material to form a smoothly flowing layer of adhesive;

applying the layer of adhesive onto at least a portion of the outer surface of the wound inner strip and at least a portion of the outer surface of the wound second strip;

wrapping a strip of composite cover material about the wound second strip and over the layer of adhesive applied to at least a portion of the outer surface, the composite cover material having an inner surface and an outer surface, the outer surface of the composite cover material comprising a pile fabric, and the inner surface of the composite cover material having a backing with a thickness of about 10 to 40 mils and comprising at least 25% but not more than 50% calcium carbonate by weight and a polypropylene-based elastomer;

applying a compressive force from without the composite cover material to urge the composite cover material, the layer of adhesive, and the inner and second strips together, thereby laminating the inner surface of the composite cover material to the outer surface of the second strip and laminating the inner surface of the second strip to the outer surface of the inner strip; and allowing the adhesive to set, thereby creating the multi-strip laminated paint roller.

14. The method of claim 13, wherein the composite cover material backing further comprises up to 50% polypropylene resin by weight.

15. The method of claim 14, wherein the composite cover material backing comprises:

(i) at least 10% but not more than 40% calcium carbonate by weight;

(ii) at least 40% but not more than 85% polypropylene-based elastomer by weight; and (iii) polypropylene resin.

16. A method for continuously making a laminated paint roller comprising the steps of:

helically winding a strip of thermoplastic material around a mandrel so as to form a helically wound strip, the strip having an inner surface and an outer surface;

advancing the helically wound strip along the mandrel;

extruding a thermoplastic material to form a smoothly flowing layer of adhesive;

applying the layer of adhesive onto at least a portion of the outer surface of the wound strip;

wrapping a strip of composite cover material about the wound strip and over the layer of adhesive applied to at least a portion of the outer surface of the wound strip, the composite cover material having an inner surface and an outer surface, the outer surface of the composite cover material comprising a pile fabric, and the inner surface of the composite cover material having a backing with a thickness of about 10 to 40 mils and comprising at least 25% but not more than 50% calcium carbonate by weight and a polypropylene-based elastomer;

applying a compressive force from without the composite cover material to urge the composite cover material, the layer of adhesive, and the strip together, thereby laminating the inner surface of the composite cover material to the outer surface of the strip; and allowing the adhesive to set, thereby creating the laminated paint roller.

17. The method of claim 16, wherein the composite cover material backing further comprises up to 50% polypropylene resin by weight.

18. The method of claim 17, wherein the composite cover material backing comprises:

(i) at least 10% but not more than 40% calcium carbonate by weight;

(ii) at least 40% but not more than 85% polypropylene-based elastomer by weight; and (iii) polypropylene resin.

* * * * *